United States Patent [19]

Nataraj et al.

[11] Patent Number: 6,114,400

[45] Date of Patent: *Sep. 5, 2000

[54] SYNTHESIS GAS PRODUCTION BY MIXED CONDUCTING MEMBRANES WITH INTEGRATED CONVERSION INTO LIQUID PRODUCTS

[75] Inventors: Shankar Nataraj; Steven Lee Russek; Paul Nigel Dyer, all of Allentown, Pa.

[73] Assignee: Air Products and Chemicals, Inc., Allentown, Pa.

[ * ] Notice: This patent is subject to a terminal disclaimer.

[21] Appl. No.: 09/157,712

[22] Filed: Sep. 21, 1998

[51] Int. Cl.$^7$ .............................. C07C 27/00; C07C 1/02; B01D 53/22
[52] U.S. Cl. .................... 518/715; 518/702; 518/703; 252/373; 95/54
[58] Field of Search .................... 518/700, 702, 518/703, 715; 252/373; 95/54

[56] References Cited

U.S. PATENT DOCUMENTS

| | | | |
|---|---|---|---|
| 4,791,079 | 12/1988 | Hazbun | 502/4 |
| 4,793,904 | 12/1988 | Mazanec et al. | 204/59 R |
| 4,919,844 | 4/1990 | Wang | 252/373 |
| 5,023,276 | 6/1991 | Yarrington et al. | 518/703 |
| 5,053,581 | 10/1991 | Hildinger et al. | 585/638 |
| 5,276,237 | 1/1994 | Mieville | 585/500 |
| 5,306,411 | 4/1994 | Mazanec et al. | 204/265 |
| 5,356,728 | 10/1994 | Balachandran et al. | 429/8 |
| 5,580,497 | 12/1996 | Balachandran et al. | 252/519 |
| 5,591,315 | 1/1997 | Mezanec et al. | 205/462 |
| 5,599,383 | 2/1997 | Dyer et al. | 96/8 |
| 5,620,670 | 4/1997 | Benham et al. | 422/213 |
| 5,621,155 | 4/1997 | Benham et al. | 585/310 |
| 5,681,373 | 10/1997 | Taylor et al. | 96/11 |
| 5,846,641 | 12/1998 | Abeles et al. | 428/312.8 |

FOREIGN PATENT DOCUMENTS

| | | | |
|---|---|---|---|
| 93/06041 | 4/1993 | WIPO . | |
| WO9712118 | 4/1997 | WIPO | E21B 43/01 |

OTHER PUBLICATIONS

Rostrup–Nielsen, J. et al., "Steam Reforming–Opportunities and Limits of the Technology", presented at the NATO ASI Study on Chemical Reactor Technology for Environmentally Safe Reactors and Predictors, Aug. 25–Sep. 5, 1991, Ontario, Canada.

Christiansen, T. S. et al. "Improve Syngas Production Using Autothermal Reforming", *Hydrocarbon Processing*, Mar. 1994, pp.39–46.

Sundset, T. et al., "Evaluation of Natural Gas Based Synthesis Gas Production Technologies", *Catalysis Today* 21 (1994), pp. 269–278.

Reed, C. L. et al. "Production of Synthesis Gas by Partial Oxidation of Hydrocarbons"presented at the 86$^{th}$ AIChE meeting, Houston, Texas, Apr. 1–5, 1979.

Fong, F., "Texaco's HyTEX Process for High Pressure Hydrogen Production", presented at the KTI Symposium, Apr. 27, 1993, Caracas, Venezuela.

Osterrieth, P. J. et al., "Custom–Made Synthesis Gas Using Texaco's Partial Oxidation Technology", presented at the AIChE Spring National Meeting, New Orleans, LA, Mar. 9, 1988.

Balachandran, U. et al. "Ceramic Membranes For Methane Conversion", presented at the Coal Liquefaction and Gas Conversion Contractors, Review Conference, Sep. 7–8, 1994, Pittsburgh, PA.

Tsai, C.–Y. et al., "Simulation of a Nonisothermal Catalytic Membrane Reactor for Methane partial Oxidation to Syngas", *Proceedings of the Third International Conference of Inorganic Membranes*, Worcester, MA, Jul. 10–14, 1994.

Tsai, C.–Y. et al., "Modeling and Simulation of a Nonisothermal Catalytic Membrane Reactor", *Chem. Eng Comm.*, 1995, vol. 134, pp.107–132.

Tsai, C. Y., "Perovskite Dense Membrane Reactors for the Partial Oxidation of Methane to Synthesis Gas", May 1996 (published by UMI Dissertation Services).

Cromarty, B. J., et al., "The Application of Pre–Reforming Technology in the Production of Hydrogen", presented at the NPRA Annual Meeting, Mar. 21–23, 1993, San Antonio, Texas.

Foreman, J. M., et al., "The Benefits of pre–reforming in Hydrogen Production Plants", presented at the World Hydrogen Conference, Jun. 1992.

Cromarty, B. J., "Modern Aspects of Steam Reforming for Hydrogen Plants", presented at the World Hydrogen Conference, Jun. 1992.

Elkins, K. J. et al., "The ICI Gas–Heated Reformer (GHR) System", presented at the Nitrogen '91 International Conference, Copenhagen, Jun. 1992.

Bussemeier, B., et al., "Fischer–Tropsch Synthesis", *Encyclopedia of Chemical Process and Design*, 22, p 81–119 (1985).

U.S. application No. 08/721,640, Adler et al., filed Sep. 26, 1996.

U.S. application No. 08/997,642, Nataraj et al., filed Dec. 23, 1997.

U.S. application No. 08/870,012, Nataraj et al., filed Jun. 06, 1997.

U.S. application No. 09/141,909, Adler et al., filed Aug. 28, 1998.

U.S. application No. 09/157,544, Nataraj et al., filed Sep. 21, 1998.

*Primary Examiner*—Johann Richter
*Assistant Examiner*—Jo Parsa
*Attorney, Agent, or Firm*—John M. Fernbacher

[57] ABSTRACT

Natural gas or other methane-containing feed gas is converted to a $C_5$–$C_{19}$ hydrocarbon liquid in an integrated system comprising an oxygenative synthesis gas generator, a non-oxygenative synthesis gas generator, and a hydrocarbon synthesis process such as the Fischer-Tropsch process. The oxygenative synthesis gas generator is a mixed conducting membrane reactor system and the non-oxygenative synthesis gas generator is preferably a heat exchange reformer wherein heat is provided by hot synthesis gas product from the mixed conducting membrane reactor system. Offgas and water from the Fischer-Tropsch process can be recycled to the synthesis gas generation system individually or in combination.

25 Claims, 4 Drawing Sheets

SYNTHESIS GAS PRODUCTION BY MIXED CONDUCTING MEMBRANES WITH INTEGRATED CONVERSION INTO LIQUID PRODUCTS

CROSS-REFERENCE TO RELATED APPLICATIONS

Not applicable.

STATEMENT REGARDING FEDERALLY SPONSORED RESEARCH OR DEVELOPMENT

This invention was made with Government support under Contract No. DE-FC26-97FT96052 between Air Products and Chemicals, Inc. and the United States Department of Energy. The Government has certain rights to this invention.

BACKGROUND OF THE INVENTION

Synthesis gas containing hydrogen and carbon oxides is an important feedstock for the production of a wide range of chemical products. Synthesis gas mixtures with the proper ratios of hydrogen to carbon monoxide are reacted catalytically to produce liquid hydrocarbons and oxygenated organic compounds including methanol, acetic acid, dimethyl ether, oxo alcohols, and isocyanates. Liquids produced by synthesis gas conversion are valuable as fuels, chemical intermediates, and final chemical products. High purity hydrogen and carbon monoxide can be recovered by further processing and separation of synthesis gas. The cost of generating the synthesis gas usually is the largest part of the total cost of these products.

Two major reaction routes are used for synthesis gas production—steam reforming of light hydrocarbons, primarily natural gas, naphtha, and refinery offgases, and the partial oxidation of carbon-containing feedstocks ranging from natural gas to high molecular weight liquid or solid carbonaceous materials. Autothermal reforming is an alternative process using light hydrocarbon feed in which both partial oxidation and steam reforming reactions occur in a single reactor. In the various versions of autothermal reforming, feed gas is partially oxidized in a specially-designed burner and the resulting hot gas passes through a catalyst bed where steam reforming and $CO_2$ reforming occur. Newer synthesis gas generation processes include various heat exchange reformers such as gas heated reforming (GHR) developed by ICI, the SMART reformer by KTI, and the CAR reformer by UHDE; the improved Texaco gasification process (TGP) included in their HyTEX™ hydrogen production system; Haldor-Topsoe's HERMES process; the Shell gasification process (SGP); Exxon's fluidized bed synthesis gas process; and Kellogg's KRES process.

The state of the art in commercial synthesis gas generation technology is summarized in representative survey articles including "Steam Reforming—Opportunities and Limits of the Technology" by J. Rostrup-Nielsen et al, presented at the NATO ASI Study on Chemical Reactor Technology for Environmentally Safe Reactors and Predictors, Aug. 25–Sep. 5, 1991, Ontario, Canada; "Improve Synthesis gas Production Using Autothermal Reforming" by T. S. Christiansen et al, *Hydrocarbon Processing*, March 1994, pp. 39–46; "Evaluation of Natural Gas Based Synthesis Gas Production Technologies" by T. Sundset et al, *Catalysis Today*, 21 (1994), pp. 269–278; "Production of Synthesis Gas by Partial Oxidation of Hydrocarbons" by C. L. Reed et al, presented at the 86th National AIChE meeting, Houston, Texas, Apr. 1–5, 1979; "Texaco's HyTEX™ Process for High Pressure Hydrogen Production" by F. Fong, presented at the KTI Symposium, Apr. 27, 1993, Caracas, Venezuela; and "Custom-Made Synthesis Gas Using Texaco's Partial Oxidation Technology" by P. J. Osterrieth et al, presented at the AIChE Spring National Meeting, New Orleans, LA, Mar. 9, 1988.

Staged steam-methane reforming processes are used to upgrade the performance of existing plants and for the design of more efficient new plants for producing synthesis gas. One type of staged reforming utilizes a prereformer, typically an adiabatic reforming reactor containing a highly active nickel catalyst, to reform heavier hydrocarbons in the feedstock (and a portion of the methane, if present) to yield a mixture of methane, hydrogen, carbon monoxide, carbon dioxide, and steam. This prereforming product is then further processed in a fired tubular reformer to produce a raw synthesis gas product. Another type of staged reformer process utilizes a gas heated reformer (GHR) followed by an autothermal reformer. The GHR is a type of heat exchange reformer in which the hot raw synthesis gas from the autothermal reformer furnishes the heat for the first reforming stage in the GHR.

Staged reforming processes are described in papers entitled "The Application of Pre-Reforming Technology in the Production of Hydrogen" by B. J. Cromarty et al, presented at the NPRA Annual Meeting, Mar. 21–23, 1993, San Antonio, Tex.; "The Benefits of Pre-reforming in Hydrogen Production Plants" by J. M. Foreman et al, presented at the World Hydrogen Conference, June 1992; and "Modern Aspects of Steam Reforming for Hydrogen Plants" by B. J. Cromarty, presented at the World Hydrogen Conference, June 1992. Gas heated reforming is described in a paper by K. J. Elkins et al entitled "The ICI Gas-Heated Reformer (GHR) System" presented at the Nitrogen '91 International Conference, Copenhagen, June 1992.

Other combinations of steam reforming and autothermal reforming are used in synthesis gas production. In the production of ammonia synthesis gas, for example, a combination of steps called primary reforming and secondary reforming is used in which natural gas is steam reformed and the resulting intermediate product is further converted in an air-fired autothermal reforming reactor to yield raw ammonia synthesis gas containing hydrogen, nitrogen, and carbon monoxide. Primary steam reforming followed by oxygen secondary reforming (autothermal reforming) is used in the production of synthesis gas containing hydrogen and carbon monoxide in which secondary reforming is carried out in an oxygen-fired autothermal reformer. Primary steam reforming can be carried out in a fired tubular reformer.

In the commercial processes described above which utilizes an autothermal reforming step, oxygen is required and is typically supplied at purities of 95 to 99.9 vol %. Oxygen is obtained by the separation of air using known methods, usually the low-temperature distillation of air for larger volumes and pressure swing adsorption for smaller volumes.

The conversion of synthesis gas into a wide variety of products is well known in the art as described in compendia such as the *Kirk-Othmer Encyclopedia of Chemical Technology*, 4th Edition, 1991, Wiley-Interscience, New York. Two of the largest volume consumers of synthesis gas in the chemical process industries are the Fischer-Tropsch process for the synthesis of higher molecular weight hydrocarbons and the various gas-phase and liquid-phase methanol synthesis processes. These high-volume products find use as fuels and as chemical intermediates for further product synthesis. The well-known Fischer-Tropsch process is described widely in the art, for example in an article entitled "Fischer-Tropsch Synthesis" by B. Bussemeier et al in the *Encyclopedia of Chemical Process and Design,* 22, p 81–119 (1985).

An alternative technology for synthesis gas production is in the early stages of development in which oxygen for the partial oxidation reactions is provided in situ by the separation of air at high temperatures using ceramic, ceramic-metal, or ceramic-ceramic composite membranes which conduct both electronic species and oxygen ions. These membranes are included in a broad class of membranes known generically as ion transport membranes, and form a specific class of ion transport membranes known collectively as mixed conducting membranes which conduct both electronic species and oxygen ions. These membranes can be used optionally in combination with appropriate catalysts to produce synthesis gas in a membrane reactor without the need for a separate oxygen production unit. The reactor is characterized by one or more reaction zones wherein each zone comprises a mixed conducting membrane which separates the zone into an oxidant side and a reactant side.

An oxygen-containing gas mixture, typically air, is contacted with the oxidant side of the membrane and oxygen gas reacts with electronic species to form oxygen ions which permeate through the membrane material. A reactant gas containing methane and other low molecular weight hydrocarbons flows across the reactant side of the membrane. Oxygen (as defined later) on the reactant side of the membrane reacts with components in the reactant gas to form synthesis gas containing hydrogen and carbon monoxide. A catalyst to promote the transfer of oxygen into the membrane can be applied to the surface of the membrane on the oxidant side. A catalyst to promote the conversion of reactant gas components to synthesis gas may be applied to the surface of the reactant side of the membrane; alternatively or additionally, a granular form of the catalyst may be placed adjacent to the membrane surface. Catalysts which promote the conversion of hydrocarbons, steam, and carbon dioxide to synthesis gas are well-known in the art.

Numerous reactors and compositions of mixed conducting membranes suitable for this purpose have been disclosed in the art. Membrane reactors and methods of operating such reactors for the selective oxidation of hydrocarbons are disclosed in related U.S. Pat. Nos. 5,306,411 and 5,591,315. Ceramic membranes with wide ranges of compositions are described which promote the transfer of oxygen from an oxygen-containing gas and reaction of the transferred oxygen with a methane-containing gas to form synthesis gas. Mixed conductors having a perovskite structure are utilized for the membrane material; alternatively multiphase solids are used as dual conductors wherein one phase conducts oxygen ions and another conducts electronic species. A membrane reactor to produce synthesis gas is disclosed which operates at a temperature in the range of 1000 to 1400° C., wherein the reactor may be heated to the desired temperature and the temperature maintained during reaction by external heating and/or exothermic heat from the chemical reactions which occur. In one general embodiment, it is disclosed that the process is conducted at temperatures within the range of 1000 to 1300° C. Experimental results are reported for oxygen flux and synthesis gas production in an isothermal laboratory reactor using a dual-conducting membrane at a constant temperature of 1100° C. Non-combustible diluents such as nitrogen, argon, helium, and other gases may be present in the reactor feed and do not interfere with the desired chemical reactions. Steam if present in the reactor feed is stated to be an inert gas or diluent.

In a paper entitled "Ceramic Membranes for Methane Conversion" presented at the Coal Liquefaction and Gas Conversion Contractors, Review Conference, Sep. 7–8, 1994, Pittsburgh, Pa., U. Balachandran et al describe the fabrication of long tubes of $Sr—Co_{0.5}—Fe—O_x$ membranes and the operation of these tubes for conversion of methane to synthesis gas in laboratory reactors at 850° C.

U.S. Pat. No. 4,793,904 discloses the use of a solid electrolyte membrane with conductive coatings on both sides which are optionally connected by an external circuit. The membrane is used in an electrolytic cell at temperatures in the range of 1050 to 1300° C. to convert methane to synthesis gas at a pressure of about 0.1 to about 100 atmospheres. Experimental results are presented for the conversion of methane to synthesis gas components in a reactor cell with an yttria-stabilized zirconia membrane having platinum electrodes optionally using an external electrical circuit. The reactor cell was operated isothermally at a temperature of 800, 1000, or 1100° C.

Related U.S. Pat. Nos. 5,356,728 and 5,580,497 disclose cross-flow electrochemical reactor cells and the operation of these cells to produce synthesis gas from methane and other light hydrocarbons. Mixed conducting membranes made of mixed oxide materials are disclosed for use in the crossflow reactor cells. The production of synthesis gas by the partial oxidation of hydrocarbons is disclosed using reactor temperatures of about 1000 to 1400° C. or alternatively in the range of about 450 to 1250° C. Experimental results are reported for synthesis gas production in isothermal tubular laboratory reactors at constant temperatures in the range of 450 to 850° C. A pressure in the ceramic tube reactor, typically about 6 inches of water head, was maintained by means of a downstream water bubbler.

U.S. Pat. No. 5,276,237 discloses the partial oxidation of methane to synthesis gas using a mixed metal oxide membrane comprising alumina with multivalent activator metals such as yttrium and barium. A process concept is disclosed with low oxygen recovery to facilitate heat removal and maintain a high oxygen partial pressure driving force. The partial oxidation reactions were carried out at a temperature in the range of about 500 to about 1200° C., and the temperature on the oxygen side of the membrane is described to be at most only a few degrees less than the reaction temperature on the reactant side of the membrane.

The practical application of mixed conducting membranes to produce synthesis gas will require reactor modules having a plurality of individual membranes with appropriate inlet and outlet flow manifolds to transport feed and product gas streams. Such modules provide the large membrane surface area required to produce commercial volumes of synthesis gas product. Module designs have been disclosed in the art which address this requirement. Previously-cited U.S. Pat. Nos. 5,356,728 and 5,580,497 describe one type of crossflow membrane reactor which has hollow ceramic blades positioned across a gas stream flow or a stack of crossed hollow ceramic blades containing channels for gas flow. Alternatively, the crossflow reactor can be fabricated in the form of a monolithic core with appropriate inlet and outlet manifolding. U.S. Pat. No. 4,791,079 discloses membrane module designs for mixed conducting membrane reactors for the oxidative coupling of methane to produce higher hydrocarbons, hydrogen, and carbon oxides.

A planar membrane module is described in U.S. Pat. No. 5,681,373 which contains a plurality of planar units each of which comprises a channel-free porous support with an outer layer of mixed conducting oxide material. An oxygen-containing gas is passed through the porous supports and permeated oxygen reacts with light hydrocarbons at the outer layer of the mixed conducting oxide material. The module is heated to a temperature ranging from about 300 to 1200° C. for continuous production of synthesis gas. U.S. Pat. No. 5,599,383 discloses a tubular solid state membrane module having a plurality of mixed conducting tubes each of which contains inner porous material which supports the tube walls and allows gas flow within the tube. The module can be used to produce synthesis gas wherein an oxygen-containing gas is passed through the inside of the tubes and a hydrocarbon-containing gas is passed over the outside of the tubes. The module is heated to a temperature ranging from 300 to 1200° C., the oxygen-containing gas is passed through the tubes, and the hydrocarbon-containing gas is passed over the outside of the tubes. Oxygen permeates through the mixed conducting tube walls and reacts with the hydrocarbon under controlled conditions to produce synthesis gas containing hydrogen and carbon monoxide. A catalyst to promote the formation of synthesis gas may be applied to the outer surface of the tubes.

The background art summarized above characterizes the temperatures and pressures in mixed conducting membrane reactors for synthesis gas production in general non-spatial terms, that is, differences in temperature and pressure as a function of reactor geometry are not considered. All of the above disclosures teach the operation of reactors at a single temperature, i.e., as isothermal reactors, particularly for laboratory-scale reactors. In some cases, general temperature ranges are disclosed for reactor operation, but no information is offered regarding how the temperature varies with reactor geometry. In all cases, gas pressures are reported as single pressures independent of geometry, and no pressure differences between the oxidant (air) side and the hydrocarbon (fuel) side are disclosed.

C.-Y. Tsai et al describe a nonisothermal, two-dimensional computational model of a mixed conducting membrane reactor using a perovskite membrane for the partial oxidation of methane to synthesis gas. This work is presented in related publications entitled "Simulation of a Nonisothermal Catalytic Membrane Reactor for Methane Partial Oxidation to Synthesis gas" in the Proceedings of the Third International Conference on Inorganic Membranes, Worcester Mass., Jul. 10–14, 1994, and "Modeling and Simulation of a Nonisothermal Catalytic Membrane Reactor" in *Chem. Eng Comm.*, 1995, Vol. 134, pp. 107–132. The simulation describes the effects of gas flow rate, reactor length, and membrane thickness on methane conversion and synthesis gas selectivity for a tubular reactor configuration with air on the shell side. Temperature profiles as a function of axial reactor position are also presented. Key parameters are held constant for all simulation cases; in particular, the pressure for both shell and tube sides of the reactor is specified at 1 atm and the inlet temperature is specified at 800° C. Additional discussion of experimental and computational work on topics in these two publications is presented in the doctoral thesis by C.-Y. Tsai entitled "Perovskite Dense Membrane Reactors for the Partial Oxidation of Methane to Synthesis Gas", May 1996, Worcester Polytechnic Institute (available through UMI Dissertation Services).

Synthesis gas produced by mixed conducting membrane reactors will find uses similar to synthesis gas produced by the conventional processes earlier described. However, methods of integrating mixed conducting membrane reactors with downstream synthesis gas consuming processes may involve different criteria than the integration of conventional synthesis gas generation processes with synthesis gas consumers.

The successful design and operation of synthesis gas production systems which utilize mixed conducting membrane reactors will depend upon the proper integration of the reactors with upstream and downstream gas processing systems. Such downstream gas processing systems include the conversion of synthesis gas into liquid hydrocarbons and oxygenated organic compounds by the processes described above. The invention described below and defined in the claims which follow addresses criteria for integrating downstream synthesis gas conversion processes, particularly for hydrocarbon fuel production, with synthesis gas production by mixed conducting membrane reactor systems.

BRIEF SUMMARY OF THE INVENTION

The invention is a method for making a hydrocarbon product which comprises:

(a) providing a mixed conducting membrane reaction zone having an oxidant side and a reactant side which are separated by a solid mixed conducting membrane;

(b) introducing a feed gas comprising at least methane into the reactant side of the mixed conducting membrane reaction zone;

(c) heating an oxygen-containing oxidant gas feed and introducing the resulting heated oxidant gas feed into the oxidant side of the mixed conducting membrane reaction zone;

(d) permeating oxygen from the oxidant side of the mixed conducting membrane reaction zone through the mixed conducting membrane to the reactant side of the mixed conducting membrane reactor and reacting the oxygen with the feed gas to form at least hydrogen and carbon monoxide;

(e) withdrawing a hot synthesis gas product comprising at least hydrogen and carbon monoxide from the reactant side of the mixed conducting membrane reaction zone;

(f) withdrawing a hot oxygen-depleted nonpermeate gas from the oxidant side of the mixed conducting membrane reaction zone;

(g) providing a hydrocarbon synthesis and processing zone and reacting at least a portion of the synthesis gas product therein;

(h) withdrawing from the hydrocarbon synthesis and processing zone streams comprising (1) a hydrocarbon product comprising components having greater than four carbon atoms, (2) an offgas comprising one or more components selected from the group consisting of hydrogen, carbon monoxide, carbon dioxide, methane, and hydrocarbons containing two or more carbon atoms, and (3) water; and (i) converting at least a portion of the offgas into a recycle gas and utilizing at least a portion of this recycle gas to provide a portion of the feed gas to the mixed conducting membrane reaction zone.

The offgas is withdrawn at an initial absolute pressure and can be compressed to a final absolute pressure such that the ratio of the final absolute pressure to the initial absolute pressure is less than about 3.0. At least 70% of the offgas can be converted into recycle gas. The hydrocarbon synthesis and processing zone preferably comprises a Fischer-Tropsch reactor system utilizing catalyst containing one or more metals selected from the group consisting of iron, cobalt, and ruthenium.

The method may comprise combining the recycle gas with natural gas and water, heating the combined stream, introducing the resulting heated combined methane-containing gas into a catalytic reforming reaction zone, withdrawing from the catalytic reforming reaction zone a partially reformed gas comprising methane, hydrogen, and carbon oxides, and utilizing the partially reformed gas to provide feed gas to the reactant side of the mixed conducting membrane reaction zone. At least a portion of the water can be provided by a portion of the water withdrawn from the hydrocarbon synthesis and processing zone. The combined methane-containing gas can be heated prior to the catalytic reforming reaction zone in an indirectly fired heater.

The catalytic reforming reaction zone can be a fixed-bed adiabatic reactor and the combined methane-containing gas can be heated prior to the catalytic reforming reaction zone by indirect heat exchange with the hot synthesis gas product from the reactant side of the mixed conducting membrane reaction zone. Alternatively, the combined methane-containing gas can be heated prior to the catalytic reforming reaction zone by indirect heat exchange with the hot oxygen-depleted nonpermeate gas from the oxidant side of the mixed conducting membrane reaction zone.

In an alternative mode, the catalytic reforming reaction zone can be a gas-heated reformer, wherein heat is provided within the reaction zone by indirect heat exchange with the hot synthesis gas product from the reactant side of the mixed conducting membrane reaction zone, and wherein an intermediate cooled synthesis gas product is withdrawn from the gas-heated reformer. The offgas, prior to mixing with steam, can be reacted with hydrogen in a catalytic hydrogenation reactor to convert unsaturated hydrocarbons in the offgas to saturated hydrocarbons. This catalytic hydrogenation reactor can contain a catalyst which is selective only to the hydrogenation of olefins, and wherein a stream of sulfur-containing natural gas is combined with the offgas prior to the catalytic hydrogenation reactor.

At least a portion of the intermediate cooled synthesis gas product can be cooled to condense and remove water contained therein prior to the hydrocarbon synthesis and processing zone.

In an alternative embodiment, the invention is a method for making a hydrocarbon product which comprises:

(a) providing a mixed conducting membrane reaction zone having an oxidant side and a reactant side which are separated by a solid mixed conducting membrane;

(b) introducing a feed gas comprising at least methane and water into the reactant side of the mixed conducting membrane reaction zone;

(c) heating an oxygen-containing oxidant gas feed and introducing the resulting heated oxidant gas feed into the oxidant side of the mixed conducting membrane reaction zone;

(d) permeating oxygen from the oxidant side of the mixed conducting membrane reaction zone through the mixed conducting membrane to the reactant side of the mixed conducting membrane reactor and reacting the oxygen with the feed gas to form at least hydrogen and carbon monoxide;

(e) withdrawing a hot synthesis gas product comprising at least hydrogen and carbon monoxide from the reactant side of the mixed conducting membrane reaction zone;

(f) providing a hydrocarbon synthesis and processing zone and reacting at least a portion of the synthesis gas product therein;

(g) withdrawing from the hydrocarbon synthesis and processing zone streams comprising (1) a hydrocarbon product comprising components having greater than four carbon atoms, (2) an offgas comprising one or more components selected from the group consisting of hydrogen, carbon monoxide, carbon dioxide, methane, and hydrocarbons containing two or more carbon atoms, and (3) water; and (i) providing at least a portion of the water in the feed gas of (b) by a portion of the water withdrawn from the hydrocarbon synthesis and processing zone of (g).

In yet another embodiment of the invention, a hydrocarbon product can be made by a method which comprises:

(a) providing a first catalytic reforming reaction zone comprising at least one catalyst which promotes the steam reforming of hydrocarbons;

(b) heating a reactant gas feed comprising water and one or more hydrocarbons, introducing the resulting heated reactant gas feed into the first catalytic reforming reaction zone, and withdrawing therefrom a partially reformed intermediate gas comprising at least methane, hydrogen, and carbon oxides;

(c) providing a mixed conducting membrane reaction zone having an oxidant side and a reactant side which are separated by a solid mixed conducting membrane;

(d) heating an oxygen-containing oxidant gas feed and introducing the resulting heated oxidant gas feed into the oxidant side of the mixed conducting membrane reaction zone;

(e) introducing the partially reformed intermediate gas of (b) into the reactant side of the mixed conducting membrane reaction zone;

(f) permeating oxygen from the oxidant side of the mixed conducting membrane reactor through the mixed conducting membrane to the reactant side of the mixed conducting membrane reaction zone, and reacting the oxygen with the partially reformed intermediate gas to form additional hydrogen and carbon monoxide;

(g) withdrawing a hot synthesis gas product comprising at least hydrogen and carbon monoxide from the reactant side of the mixed conducting membrane reaction zone;

(h) withdrawing a hot oxygen-depleted nonpermeate gas from the oxidant side of the mixed conducting membrane reaction zone;

(i) reacting a hydrocarbon-containing recycle stream and water in a second catalytic reforming reaction zone to generate recycle gas comprising at least methane, hydrogen, and carbon oxides;

(j) providing a hydrocarbon synthesis and processing zone and reacting therein at least a portion of a combined stream comprising the synthesis gas product of (g) and the recycle gas of (i);

(k) withdrawing from the hydrocarbon synthesis reaction zone streams comprising (1) a hydrocarbon product comprising components having greater than four carbon atoms, (2) an offgas comprising components selected from the group consisting of hydrogen, carbon monoxide, carbon dioxide, methane, and hydrocarbons containing two or more carbon atoms, and (3) water; and (l) utilizing at least a portion of the offgas of (k) to provide the hydrocarbon-containing recycle stream of (i).

The reactant gas feed of (b) can be natural gas. At least 70% of the offgas of (k) can be is utilized to provide the hydrocarbon-containing recycle stream of (i).

The hydrocarbon synthesis and processing zone preferably comprises a Fischer-Tropsch reactor system utilizing catalyst containing one or more metals selected from the group consisting of iron, cobalt, and ruthenium.

The second catalytic reforming reaction zone can be an enhanced heat transfer reformer, wherein heat is provided to the reaction zone by indirect heat exchange with the hot synthesis gas product from the reactant side of the mixed conducting membrane reaction zone, and wherein the effluent from the enhanced heat transfer reformer is a combination of the synthesis gas product of (g) after cooling and the recycle gas of (i).

At least a portion of the water in the reactant gas feed to the first catalytic reforming reaction zone can be provided by a portion of the water from the hydrocarbon synthesis and processing zone. Alternatively or additionally, at least a portion of the water to the second catalytic reforming reaction zone can be provided by a portion of the water from the hydrocarbon synthesis and processing zone.

The hydrocarbon-containing recycle stream, prior to mixing with water in the form of steam, can be reacted with hydrogen in a catalytic hydrogenation reactor to convert unsaturated hydrocarbons in the offgas to saturated hydrocarbons. The catalytic hydrogenation reactor can contain a catalyst which is selective only to the hydrogenation of olefins, and wherein a stream of sulfur-containing natural gas is combined with the offgas prior to the catalytic hydrogenation reactor. At least a portion of the effluent from the enhanced heat transfer reformer can be cooled to condense and remove water contained therein prior to the hydrocarbon synthesis reaction zone.

Another embodiment of the invention embraces a method for making a hydrocarbon product which comprises:

(a) providing a catalytic reforming reaction zone comprising at least one catalyst which promotes the steam reforming of hydrocarbons;

(b) heating a reactant gas feed comprising water and one or more hydrocarbons, introducing the resulting heated reactant gas feed into the catalytic reforming reaction zone, and withdrawing therefrom a hot partially reformed intermediate gas comprising at least methane, hydrogen, and carbon oxides;

(c) providing a mixed conducting membrane reaction zone having an oxidant side and a reactant side which are separated by a solid mixed conducting membrane;

(d) heating an oxygen-containing oxidant gas feed and introducing the resulting heated oxidant gas feed into the oxidant side of the mixed conducting membrane reaction zone;

(e) introducing the partially reformed intermediate gas of (b) into the reactant side of the mixed conducting membrane reaction zone;

(f) permeating oxygen from the oxidant side of the mixed conducting membrane reactor through the mixed conducting membrane to the reactant side of the mixed conducting membrane reaction zone, and reacting the oxygen with the partially reformed intermediate gas to form additional hydrogen and carbon monoxide;

(g) withdrawing a hot synthesis gas product comprising at least hydrogen and carbon monoxide from the reactant side of the mixed conducting membrane reaction zone;

(h) providing a hydrocarbon synthesis and processing zone and reacting therein at least a portion of the hot synthesis gas product of (g);

(i) withdrawing from the hydrocarbon synthesis and processing zone streams comprising (1) a hydrocarbon product comprising components having greater than four carbon atoms, (2) an offgas comprising components selected from the group consisting of hydrogen, carbon monoxide, carbon dioxide, methane, and hydrocarbons containing two or more carbon atoms, and (3) water; and (j) utilizing a portion of the water from the hydrocarbon synthesis and processing zone of (i) to provide at least a portion of the water in the reactant gas feed of (b).

DETAILED DESCRIPTION OF THE INVENTION

Figure 1:
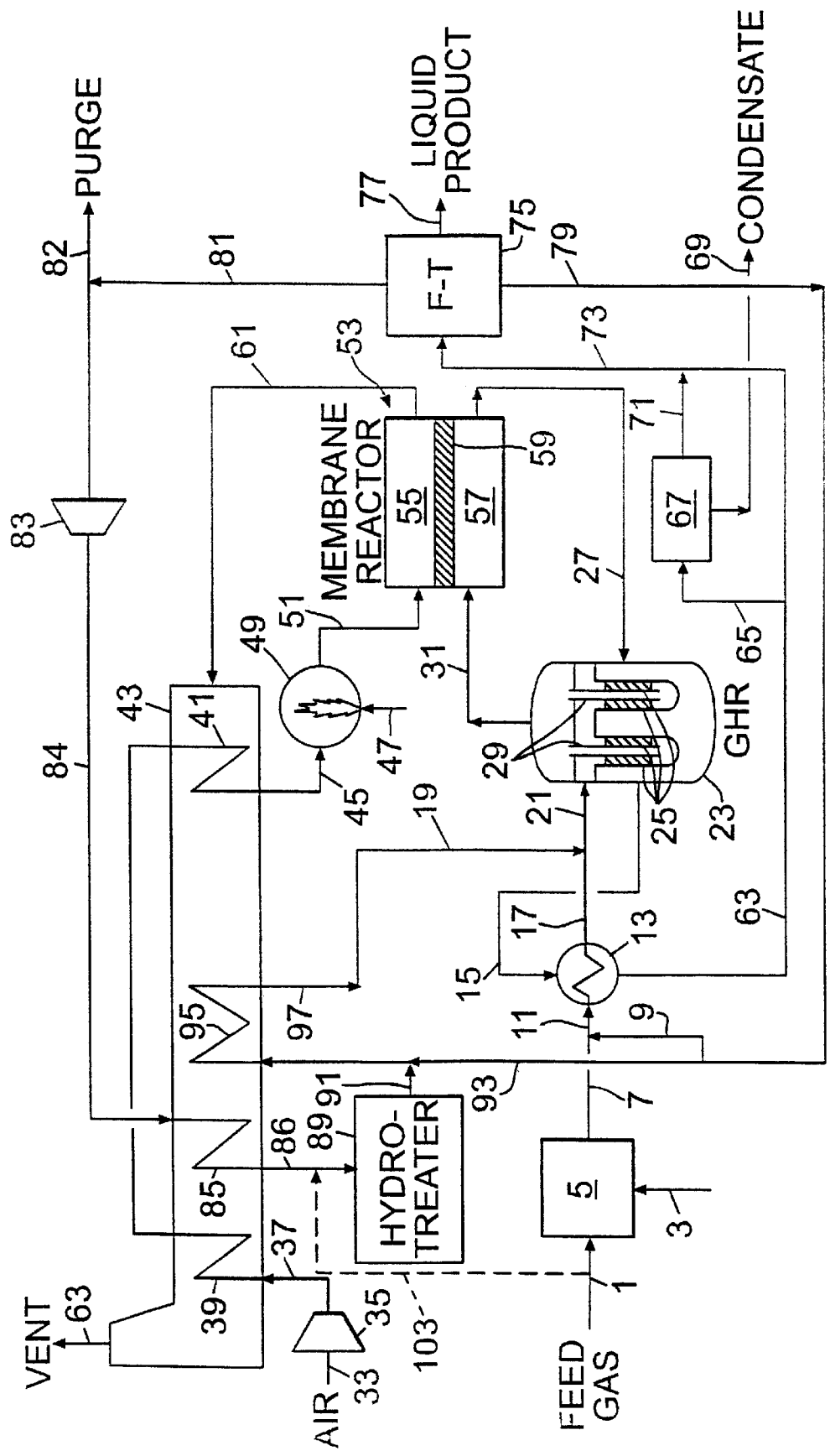
FIG. 1 is a schematic flow diagram of one embodiment of the present invention which utilizes steam reforming in combination with a mixed conducting membrane reactor for the generation of synthesis gas feed and its conversion to hydrocarbons in a Fischer-Tropsch hydrocarbon synthesis process.

The present invention is an integrated method for the conversion of light hydrocarbons, particularly methane, into liquid hydrocarbon products. Synthesis gas for producing these liquids is generated by combinations of steam reforming and partial oxidation using a mixed conducting membrane reactor. Hydrocarbon liquids are preferably produced using the well-known Fischer-Tropsch (F-T) catalytic process which is integrated with the synthesis gas generating process such that the heat content of hydrocarbon-containing feed gases, particularly natural gas, is recovered in a low volatility, pumpable liquid with high efficiency and low impact on the environment.

The Fischer-Tropsch process has been integrated with conventional synthesis gas generation processes such as steam-methane reforming (SMR), autothermal reforming (ATR), partial oxidation (POX), and combinations of these processes. Synthesis gas generation using mixed conducting membrane reactors has certain unique features which allow integration and operational benefits not achievable by conventional synthesis gas generation technologies.

One of the attractive features of mixed conducting membrane reactors is that the power consumption is much lower than conventional partial oxidation technologies since mixed conducting membrane reactors do not require an external high pressure oxygen supply. This feature is utilized beneficially in the present invention along with utilization of excess water generated by the F-T process and the recycle of processed or converted F-T offgas to the mixed conducting membrane reactor.

Substantially complete recycle of the offgas from the F-T reactor to the synthesis gas generation step is possible if there is a proper balance between oxygenative reforming (defined here as exothermic hydrocarbon conversion processes which use oxygen gas as a reactant, such as ATR, POX, or mixed conducting membrane reactors) with non-oxygenative reforming (defined here as endothermic hydrocarbon conversion processes which use steam and/or $CO_2$ as reactants instead of oxygen gas). The non-oxygenative reforming must be non-adiabatic; if it is adiabatic, substantially complete recycle of the offgas from the F-T reactor to the synthesis gas generation step will not be possible. Such balanced reforming can reduce or eliminate the amount of F-T offgas which must be purged or exported from the system. While partial recycle of this gas to conventional synthesis gas generating systems is known, there is no prior art regarding such recycle in mixed conducting membrane reactor systems. A proper balance between oxygenative and non-oxygenative non-adiabatic reforming according to the present invention allows much higher F-T offgas recycle to the synthesis gas generating system than is possible with existing conventional technology.

As described in the invention, non-oxygenative reforming can be carried out in series or parallel with the oxygenative reforming step. If operated in parallel, the non-oxygenative reforming preferably is accomplished in a heat exchange reformer. If operated in series, the non-oxygenative reformer (s) should precede the oxygenative reformer. Preferably, at least one of these non-oxygenative reformers is a heat-exchange reformer. Several reforming embodiments are possible as described below.

The recycle gas from the F-T process can contain heavy ($C_8^+$) hydrocarbons and olefins. Such species can be handled directly by conventional oxygenative reforming processes (ATR and POX). However, these species can cause carbon deposition in non-oxygenative reformers which use nickel-based catalysts (such as the mixed conducting membrane reactors or conventional non-oxygenative reformers). The present invention addresses methods to process these species in the synthesis gas generation steps. It is recognized that F-T reactors using a cobalt-containing catalyst under conditions of high chain growth minimize olefin production. The present invention allows the recovery of F-T offgas substantially at the F-T reactor pressure, which minimizes the recompression requirements for recycling this gas to the synthesis gas generation system. The present invention avoids an acid gas removal system to recycle $CO_2$; instead, the F-T offgas containing $CO_2$ is recovered at high pressure along with other useful components to be recycled.

The F-T process generates an enormous surplus of steam, generally considered to be low-grade by the industry. Traditionally, this steam has been used to drive compression or other equipment, and has not been used as a reactant in the synthesis gas generation process. In the present invention, conditions in the F-T and synthesis gas generation systems are matched to enable the use of this steam as a process stream in the synthesis gas preparation section. The mixed conducting membrane reactor benefits from process steam in controlling potential thermal runway, increasing methane conversion, and eliminating problems of carbon deposition. The heat exchange reformers also have steam requirements. In contrast, a POX process requires no steam, and an ATR process requires comparatively less steam.

A high chain growth F-T reactor generates waxes, which need to be hydrocracked to lower molecular weight hydrocarbons. In the present invention, hydrogen for this purpose is obtained from the synthesis gas itself or from F-T offgas which is returned to the synthesis gas generating system. The F-T process generates water, which is removed from the reactor product gas by condensation to yield an aqueous stream contaminated with oxygenates. Discharge of this aqueous stream into the enviroment would require treatment to remove these contaminants. The present invention allows the recycle of at least a portion of this water as process steam to the synthesis gas generation system, where the oxygenates are consumed. This allows net condensate to be exported from the overall system as relatively clean condensate from the synthesis gas generating system or as the vapor exhaust of partially condensing steam drives if the steam is used for this purpose.

The first embodiment of the invention is illustrated in the schematic flowsheet of FIG. 1. Feed gas 1 is a natural gas which is predominantly methane with lower concentrations of heavier hydrocarbons, organic sulfur compounds, hydrogen sulfide, and non-combustible components such as carbon dioxide and nitrogen. The term natural gas as used here includes gas produced exclusively from gas fields, or gas associated with crude oil production, or combinations of the two.

Feed gas 1, adjusted in pressure to about 100–700 psig (6.9 to 48.3 barg), preferably 200–400 psig (13.8 to 22.6 barg), and hydrogen-containing gas 3 are introduced into desulfurization system 5 in which the gas is heated and organic sulfur compounds are catalytically hydrogenated to hydrogen sulfide, and any olefins present are converted to paraffins. Hydrogen sulfide is removed by a suitable sorbent such as zinc oxide. Desulfurized feed gas 7 is mixed with steam 9 to yield steam-methane feed 11 having a steam-to-carbon molar ratio of greater than 1.0, preferably 2.5–3.0. Steam-to-carbon molar ratio is defined as the moles of steam divided by the total moles of hydrocarbon compounds and carbon monoxide expressed as carbon. Steam-methane feed 11 is further heated to about 800° F. to 1022° F. in heat exchanger 13 against hot process gas 15 (later defined).

Heated feed gas 17 is combined with hot treated or converted recycle gas 19 (later defined) and the combined stream 21 is introduced into gas-heated reformer (GHR) 23 which contains reforming catalyst in annular channels 25 which are disposed in an indirect exchange heat relationship with hot process gas stream 27 (later defined) which provides the heat required for endothermic reforming reactions occurring on the catalyst side of the tubes or channels. The GHR is a non-adiabatic reformer since heat is introduced into the reactor by hot process gas 23. A nickel-based steam reforming catalyst such as ICI Katalco 57-4M can be used. One commercially available type of GHR which is particularly suitable in the process of the present invention is the ICI gas-heated reformer described in the earlier cited paper by K. J. Elkins et al entitled "The ICI Gas-Heated Reformer (GHR) System" presented at Nitrogen '91 International Conference, Copenhagen, June 1991.

The feed gas passes through the reforming catalyst in gas heated reformer 23 and all hydrocarbons heavier than methane are converted to methane, and some of the methane in the feed is reformed to hydrogen and carbon monoxide as the temperature of the gas rises with progression through the catalyst beds. The reaction product flows through center tubes 29 with insulated walls as shown, and is withdrawn as heated partially reformed intermediate gas 31 containing at least hydrogen, carbon dioxide, water, and methane.

A number of chemical reactions occur among the chemical species present in reforming and partial oxidation reaction systems, which species can include oxygen, hydrogen, water, carbon monoxide, carbon dioxide, methane, heavier hydrocarbons, and elemental carbon. Some of the more important reactions are as follows:

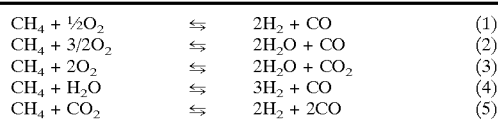

-continued

| | | | |
|---|---|---|---|
| $CO + H_2O$ | $\leftrightarrows$ | $H_2 + CO_2$ | (6) |
| $H_2 + CO$ | $\leftrightarrows$ | $C + H_2O$ | (7) |
| $2CO$ | $\leftrightarrows$ | $C + CO_2$ | (8) |
| $C_nH_m$ | $\leftrightarrows$ | $nC + m/2H_2$ | (9) |
| $C_nH_m + nH_2O$ | $\leftrightarrows$ | $nCO + (n+m/2)H_2$ | (10) |
| $C_nH_m + nCO_2$ | $\leftrightarrows$ | $2nCO + (m/2)H_2$ | (11) |

Reactions similar to oxidation reactions (1), (2), (3) above also can occur with heavier hydrocarbons as well under the proper conditions. Reaction (9) is a simple stoichiometric representation of several parallel, complex reaction sequences, including the formation of olefins and their polymerization into carbon. Reactions 4, 5, 10, and 11 represent the non-oxygenative conversion of hydrocarbon into synthesis gas components, which can be described generically as reforming. Reactions 1, 2, and 3 represent the oxygenative conversion of hydrocarbon into synthesis gas components, which can be described generically as partial oxidation, and cannot occur in a non-oxygenative reformer such as a GHR.

Oxygen-containing gas 33, preferably air, is pressurized in compressor or blower 35 to a pressure in the range of about 1 to about 900 psig (0.069 to 62.1 barg), preferably less than about 10 psig (0.69 barg). While air is the preferred oxygen-containing gas, other oxygen-containing gases can be utilized as an oxygen source for the process as described later. Pressurized oxygen-containing gas 37 is preheated in heat exchangers 39 and 41 in heat exchange zone 43, and preheated oxygen-containing gas 45 is heated further if necessary by direct combustion with fuel 47 in burner 49 to yield heated oxidant 51 typically containing 15 to 21 vol % oxygen at a temperature of 1200 to 1740° F. (650 to 950° C.). This temperature is preferably within ±200° F. of the temperature of heated partially reformed intermediate gas 31 at the inlet to mixed conducting membrane reactor 53. Optional burner 49 represents any type of known, commercially-available combustion device for promoting essentially complete combustion of fuel 47 in an excess oxygen environment, and the heating of oxygen-containing gas 45 in this manner is defined as heating by direct combustion. Fuel 47 can include purge gases from downstream synthesis gas consuming unit operations, supplemented by natural gas for startup or control. Depending upon the degree of additional heat transfer in heat exchange zone 43 as described later, burner 49 may be required only for system startup.

The term oxygen is used herein to describe generically any form of oxygen (O, atomic number 8) present in the gas streams and reactor systems described. The generic term oxygen includes dioxygen ($O_2$), oxygen ions (for example $O^-$ or $O^=$), atomic oxygen (O·), or other forms of oxygen derived from dioxygen in the gas streams and systems described. The term oxygen ion means any form of charged oxygen. The term oxygen as used herein does not include oxygen which is chemically bound in carbon oxides, nitrogen oxides, or other oxygen-containing compounds.

Heated oxidant 51 and heated partially reformed intermediate gas 31 are introduced into respective oxidant and reactant inlets to mixed conducting membrane reactor 53. Heated oxidant 51 is at a temperature preferably within ±200° F. of the temperature of heated partially reformed intermediate gas 31 at the inlet to mixed conducting membrane reactor 53.

Mixed conducting membrane reactor 53 is shown schematically having oxidant side 55 separated from reactant side 57 by mixed conducting membrane 59 and is presented in this simplified format for the following description of the reactor operation. Oxidant side 55 represents a reactor volume through which the oxidant gas flows and contacts the oxidant side surface of mixed conducting membrane 59. Dioxygen is ionized at this surface to form oxygen ions and the oxygen ions permeate mixed conducting membrane 59 to the reactant side surface of the membrane.

The term mixed conducting membrane as used herein defines a solid material or mixture of solid materials which simultaneously conducts both charged oxygen species (for example oxygen ions) and electronic species (for example electrons). The mixed conducting membrane can comprise any solid material or materials known in the art which perform these simultaneous functions. Such materials are described for example in the earlier-cited U.S. Pat. No. 5,306,411, in a paper entitled "Electropox Gas Reforming" by T. J. Mazanec in *Electrochem. Soc. Proceedings* 95–24, 16(1997), and in patent application WO 97/41060 describing mixed conducting membranes containing material with a brownmillerite structure.

Alternatively, the mixed conducting membrane can be a mixture of one or more ion conducting solid materials and one or more solid materials which conduct electronic species (such as electrons) wherein the mixture of solid materials forms a composite mixed conducting membrane. One example of a composite mixed conducting membrane uses zirconia as the charged oxygen species conducting solid material and palladium as the conductor of electronic species. Another example of a composite mixed conducting membrane uses zirconia as the charged oxygen species conducting solid material and a mixture of indium and praseodymium oxides as the conductor of electronic species.

The term mixed conducting membrane as defined above is included in the generic class of membranes which has been described in the art by the term ion transport membrane. In the present disclosure, the term mixed conducting membrane is used in the context of the above definitions.

The active mixed conducting membrane material in mixed conducting membrane 59 can be a thin layer on a planar or tubular porous support as is known in the art. The support may be fabricated from an inert material which does not conduct oxygen ions and/or electronic species at process operating conditions. Alternatively the support can be an ionically conducting material, an electronic species conducting material or a mixed conducting oxide material of the same or different composition than the active layer of mixed conducting membrane material. Preferably, the porous support is fabricated from a material having thermal expansion properties which are compatible with the mixed conducting membrane material, and the compositions making up the respective layers should be selected from materials which do not adversely chemically react with one another under process operating conditions.

The surface of mixed conducting membrane 59 in oxidizing side 55 optionally can be coated with catalytic material to promote the transfer of oxygen into the membrane. Such materials are known in the art and include metals and oxides of metals selected from Groups 2, 5, 6, 7, 8, 9, 10, 11, 13, 14, 15 and the F Block lanthanides of the Periodic Table of the Elements according to the International Union of Pure and Applied Chemistry. Suitable metals include platinum, palladium, ruthenium, silver, bismuth, barium, vanadium, molybdenum, cerium, praseodymium, cobalt, rhodium and manganese.

Reactant side 57 represents a reactor volume through which partially reformed intermediate gas 31, also described herein as reactant gas 31, flows and reacts with oxygen which has permeated through mixed conducting membrane 59. A number of chemical reactions occur in reactant side 57 among the several chemical species present including oxygen, hydrogen, water, carbon monoxide, carbon dioxide, methane, and possibly elemental carbon. These primary reactions (1) to (8) have been earlier described.

These reactions are similar to the known reactions which occur in the conventional autothermal reforming of methane to product synthesis gas. Oxidation reactions (1), (2), and (3) are shown as consuming dioxygen, which may occur in reactant side 57 of membrane reactor 53. In addition, other forms of oxygen as earlier described may react with methane, CO, and $H_2$ to form $H_2O$, CO, $CO_2$, and $H_2$. The exact reaction mechanisms between permeated oxygen and hydrocarbons in reactant side 57 are not fully understood, but at least carbon monoxide and hydrogen are net formed as final reaction products. Reactions (1), (2), (3), and (6) are exothermic while reactions (4) and (5) are endothermic; the exothermic reactions (2) and (3) are kinetically very fast, require some form of oxygen, and can occur without any catalyst; while the endothermic reactions (4) and (5) are slower, and benefit from the reforming catalyst. The net result of these reactions, which convert methane into hydrogen and carbon oxides, is defined as oxidative reforming. This distinguishes the process from steam/$CO_2$ reforming, which is defined as non-oxidative reforming.

Reactions (7), (8), and (9) form elemental carbon which is undesirable in reactor operation. The deposition of carbon, also known as coking, can cause serious problems at the reactor inlet, within the reactor, and in outlet lines downstream of the reactor. Reaction (9) is known as hydrocarbon cracking, particularly the cracking of the higher hydrocarbons such as ethane, propane, and butane which are present in natural gas at low but significant concentrations. Cracking is favored by high temperatures, and can occur over hot metallic surfaces, nickel catalyst sites, and acidic sites on refractory materials such as catalyst supports. The reactant inlet piping and the feed region of membrane reactor 53 are particularly vulnerable to carbon deposition by this mechanism if heavier hydrocarbons are present in reactant feed 31. The extent of carbon deposition by reaction (9) is determined by the reactant feed temperature, composition, and pressure.

As earlier described, essentially all hydrocarbons heavier than methane are converted in gas heated reformer 23, and carbon deposition by reaction (9) will be negligible since methane itself is much more stable relative to the heavier hydrocarbons present in natural gas. A mixture containing methane, steam, hydrogen, CO, and $CO_2$, but no hydrocarbons heavier than methane, i.e. partially reformed intermediate gas 31, can be relatively stable at higher temperatures than mixtures containing hydrocarbons heavier than methane.

A desirable feature of the present invention is that reactant gas 31 can be preheated to a temperature above 1200° F. (649° C.) prior to membrane reactor 53, at which temperature there is sufficient oxygen flux allowing the reactant gas temperature within reactant side 57 to increase rapidly to the preferred temperature range above 1500° F. (816° C.) as exothermic reactions occur therein.

The total gas pressure at any point in reactant side 57 is about 50 to 600 psig (3.5 to 41.4 barg), preferably 200 to 400 psig (13.8 to 22.6 barg), and a small pressure drop occurs from the inlet to the outlet. The total gas pressure at any point in oxidant side 45 should be in the range of about 1 to about 600 psig (0.069 to 41.4 barg), preferably less than about 10 psig (0.69 barg); the pressure decreases slightly from the inlet to the outlet. It is preferred but not required that the total pressure at any point in reactant side 57 of the reaction zone 53 is greater than the total pressure at any point in oxidant side 55.

In the reactions discussed above, one mole of methane yields close to one mole of carbon monoxide which is contained in about 3 moles of synthesis gas, which is withdrawn at approximately the pressure of reactant side 57 of membrane reactor 53. The partial oxidation process typically requires about 0.6 moles of oxygen per mole of methane, which needs at a minimum about 3 moles of air at 100% oxygen recovery, and substantially more at lower recovery. For feedstocks heavier than methane, each carbon atom yields close to one mole of CO which is contained in 2 to 3 moles of synthesis gas.

Air 33 is available at ambient pressure. The compressor power required for compressor or blower 35 is roughly proportional to the molar flow rate and the logarithm of the pressure ratio. The cost of the compressor is sensitive to the actual volumetric flow rate at inlet conditions—lower inlet pressures can increase the compressor size and cost, even at the same molar flow rate. Compression ratios less than about 3 generally need only a single stage of compression; higher ratios need additional stages with intercoolers.

Compressing air 33 to a high pressure is not desirable since air is required at the highest flow rate and is available at ambient pressure.

Thus the membrane reactor preferably is designed to operate with the maximum pressure differential between the reactant side and the oxidant side subject to reasonable mechanical and fabrication constraints. The oxidant side should be operated as close to ambient pressure as possible sufficient to overcome the total system pressure drop, the membrane reactor should be designed to minimize the pressure drop therein, and fan or blower 35 preferably is used to supply air 37 to the reactor oxidant preparation system.

As the oxidant and reactant gases flow through membrane reactor 53, oxygen permeates through mixed conducting membrane 59 and reactions (1) through (6) proceed in reactant side 57 to yield the desired synthesis gas product. Preferably a reforming catalyst is applied to at least a portion of the reactant side surface of mixed conducting membrane 59 to promote the desired reactions. Alternatively or additionally, reforming catalyst in granular or pellet form can be packed into reactant side 57 adjacent to the surface of mixed conducting membrane 59. Catalysts for this purpose are well known in the art.

Raw synthesis gas product 27 is withdrawn at the outlet of reactant side 57 of membrane reactor 53 at a temperature of greater than about 1500° F. (816° C.) and contains hydrogen and carbon monoxide with a hydrogen to carbon monoxide molar ratio of 1 to 4. There is negligible dioxygen ($O_2$), and the gas is within a 50° F. approach to reforming and shift equilibrium so that the $H_2$, CO, $CO_2$, $CH_4$ and $H_2O$ content can be calculated from the published values of the equilibrium constants for the reforming and shift reactions as a function of temperature. Raw synthesis gas product 27 is the same stream as hot process gas stream 27 earlier described.

Oxygen-depleted non-permeate 61 is withdrawn from oxidant side 55 at a temperature at or slightly below that of raw synthesis gas product 27. With oxidant and reactant in cocurrent flow through the membrane reactor, the temperature of non-permeate 61 can approach to within 9 to 180° F. (5 to 100° C.) of the temperature of raw synthesis gas product 27. The temperature rises in a controlled manner from the inlet to the outlet of membrane reactor 53 because the combination of individual endothermic and exothermic reactions which occur therein are net exothermic as earlier described.

Preferably at least about 90% of the oxygen in heated oxidant 51 permeates mixed conducting membrane 59, so that oxygen-depleted non-permeate 61 preferably contains less than about 2 vol % oxygen. A high oxygen recovery will minimize the power requirements of compressor or blower 35 because a minimum volume of gas is compressed.

Oxygen-depleted non-permeate 61 provides hot process gas to heat exchange zone 43 earlier described. Heat exchange zone 43 is essentially a conventional flue gas duct as used in steam-methane reforming furnaces which is laced with various heat exchanger coils for heating the appropriate process streams as described herein. A major portion of the heat content of oxygen-depleted non-permeate 61 is transferred via heat exchangers 39, 41, and optionally other heat exchangers to heat process streams as described below. The flue gas side of this heat exchange duct generally operates at a pressure drop of 12 to 30 inches of water and discharges final flue gas 63 to the atmosphere. An induced draft fan (not shown) can be used to discharge the exhaust steam 63 into the atmosphere at a temperature at least 100° F. above its dew point.

Mixed conducting membrane reactor 53 as described above is presented in a simplified format for explanation of the membrane reactor process features. In actual practice, mixed conducting membrane reactor 53 comprises one or more reactor modules, each of which contains multiple membranes with multiple oxidant and reactant channels or cells wherein a single reaction cell is characterized by oxidant side 55, reactant side 57, and mixed conducting membrane 59 of FIG. 1. Numerous designs of membrane reactor modules for this purpose have been described in the art as summarized in the background information presented above, and these designs include both cocurrent flow and crossflow modules utilizing tubular, corrugated plate, and monolith configurations.

Raw synthesis gas product 27 cools as heat is transferred to the reactions occurring in gas heated reformer 23 as earlier described. Intermediate cooled synthesis gas withdrawn therefrom provides hot process stream 15 as earlier described, and this stream is further cooled in heat exchanger 13 to yield further cooled synthesis gas 63. A portion 65 of cooled synthesis gas 63 is further treated in synthesis gas processing zone 67 in which the gas is further cooled to condense and remove essentially all water present, which is withdrawn as synthesis gas condensate 69. This condensate is relatively clean and contains primarily dissolved carbon dioxide and synthesis gas components. Dewatered synthesis gas 71 is combined with the remaining synthesis gas to yield final synthesis gas 73. Final synthesis gas 73 is introduced into Fischer-Tropsch hydrocarbon synthesis and processing zone 75.

Fischer-Tropsch hydrocarbon synthesis and processing zone 75 (discussed in detail later) includes all process steps required to convert synthesis gas to a liquid hydrocarbon products by methods known in the art. Hydrocarbon synthesis and processing zone 75 includes some or all of the following process equipment: catalytic reactors, reactor cooling systems, catalyst handling and catalyst-wax separation systems, reactor product cooling and separation systems, reactor feed heating systems, hydrocracking and hydrotreating reactors, and condensate handling and steam generation systems. The main effluent streams from processing zone 75 are liquid hydrocarbon product 77 which contains $C_5$ to $C_{19}$ hydrocarbons suitable for pumping and transportation to a site for further fractionation and processing into final products; recycled water 79 as described below, and offgas 81 typically at 150 to 500 psia comprising components selected from hydrogen, carbon monoxide, carbon dioxide, methane, and saturated and olefinic light hydrocarbons typically containing up to four carbon atoms. Other effluent streams (not shown) may include non-recycled water, a low pressure offgas suitable for fuel, and optionally an LPG stream containing mainly propane and butane.

The term "water" as used herein generically means the chemical form of water ($H_2O$) in gas, liquid, or both gas and liquid phases. Water can exist entirely in the gaseous phase or can be entirely condensed as liquid water. Water 79 from hydrocarbon synthesis and processing zone 75 can be liquid, gas, or a combination thereof. Water 79 can be byproduct water formed in the F-T reactor(s) which is removed from reactor raw product gas by condensation. The condensate may be revaporized by cooling the F-T reactor(s) or by externally-supplied heat to provide steam, and this steam would contain vaporized oxygenated byproducts. Alternatively, water 79 can be steam formed by vaporizing externally-supplied liquid water using the exothermic heat of reaction in the F-T reactor(s). In this case the steam would not contain oxygenated hydrocarbons. Externally supplied means water supplied from sources outside of the F-T hydrocarbon synthesis and processing zone 75.

A portion of offgas 81, preferably withdrawn at near reactor pressure as discussed elsewhere, is compressed as required in compressor 83. An oil removal system (not shown) following compressor 83 preferably is used to remove $C_8^+$ heavies from compressed offgas 84. A carbon bed temperature swing adsorption (TSA) system can be used in this service, and the TSA would be regenerated by low-grade steam produced elsewhere in the plant. Compressed offgas also contains olefins, carbon oxides and hydrogen. Preferably, compressor 83 operates at an overall compression ratio of no more than 3:1. A purge stream 82 is withdrawn as required to prevent buildup of inert gases in the overall reaction system. Preferably at least 70% of offgas 81 is compressed for return as compressed offgas 84 to the synthesis gas generation section.

Compressed offgas 84 is heated in heat exchanger 85, and heated compressed offgas 86 is treated in hydrotreating zone 89 to saturate the olefins present. Typically, there is sufficient $H_2$ present in the offgas itself for the hydrogenation reaction; if not, $H_2$ can be sourced similar to the $H_2$ for wax hydrogenation as discussed later. In a preferred embodiment, the hydrotreater has a catalyst that is substantially non-selective to hydrogenation of carbon oxides (also known as methanation, the reverse of reaction (4) and (6) listed above). An example of such a catalyst is sulfided Ni molybdate (NiMo). A presulfided form of the catalyst can be used if desired. More preferably, an amount of non-desulfurized natural gas 103 is mixed with heated compressed offgas 86 so that the mixed feed to hydrotreating zone 89 contains at least 2 ppm sulfur which is required to keep the NiMo catalyst sufficiently sulfided. In this case, the hydrotreating zone 89 would include a sulfur sorbent such as ZnO after the hydrotreating catalyst section to remove all traces of sulfur to <50 ppb.

Hydrotreated effluent or recycle gas 91 is combined with steam 93, and the combined stream is further heated in heat exchanger 95. Heated hydrotreated recycle gas 97 provides hydrotreated recycle gas 19 earlier described.

In an alternative preferred embodiment, feed gas 1 and compressed offgas 84 are combined prior to hydrotreatment/ desulfurization utilizing the above-mentioned sulfided NiMo catalyst. Example 1 later shows another embodiment where a non-selective Ni catalyst can be used; the overall thermal mass of fresh desulfurized feed, compressed offgas 84, and process steam serves to control the exotherm of the methanation reaction.

Water 79 may be F-T byproduct steam as discussed above, and in this case will contain low but significant amounts of oxygenated byproducts. Recycled water 79 provides reactant steam via stream 9 and stream 93 for gas heated reformer 23 as earlier described, and oxygenated byproducts present in the steam are converted to synthesis gas components in this reformer.

The general characteristic of the embodiment of FIG. 1 is that heated feed gas 17 and hydrotreated recycle gas 19 are combined and converted into synthesis gas feed by series operation of gas heated reformer 23 and mixed conducting membrane reactor 53. The heat generated in mixed conducting membrane reactor 53 is used efficiently in gas heated reformer 23.

Figure 2:
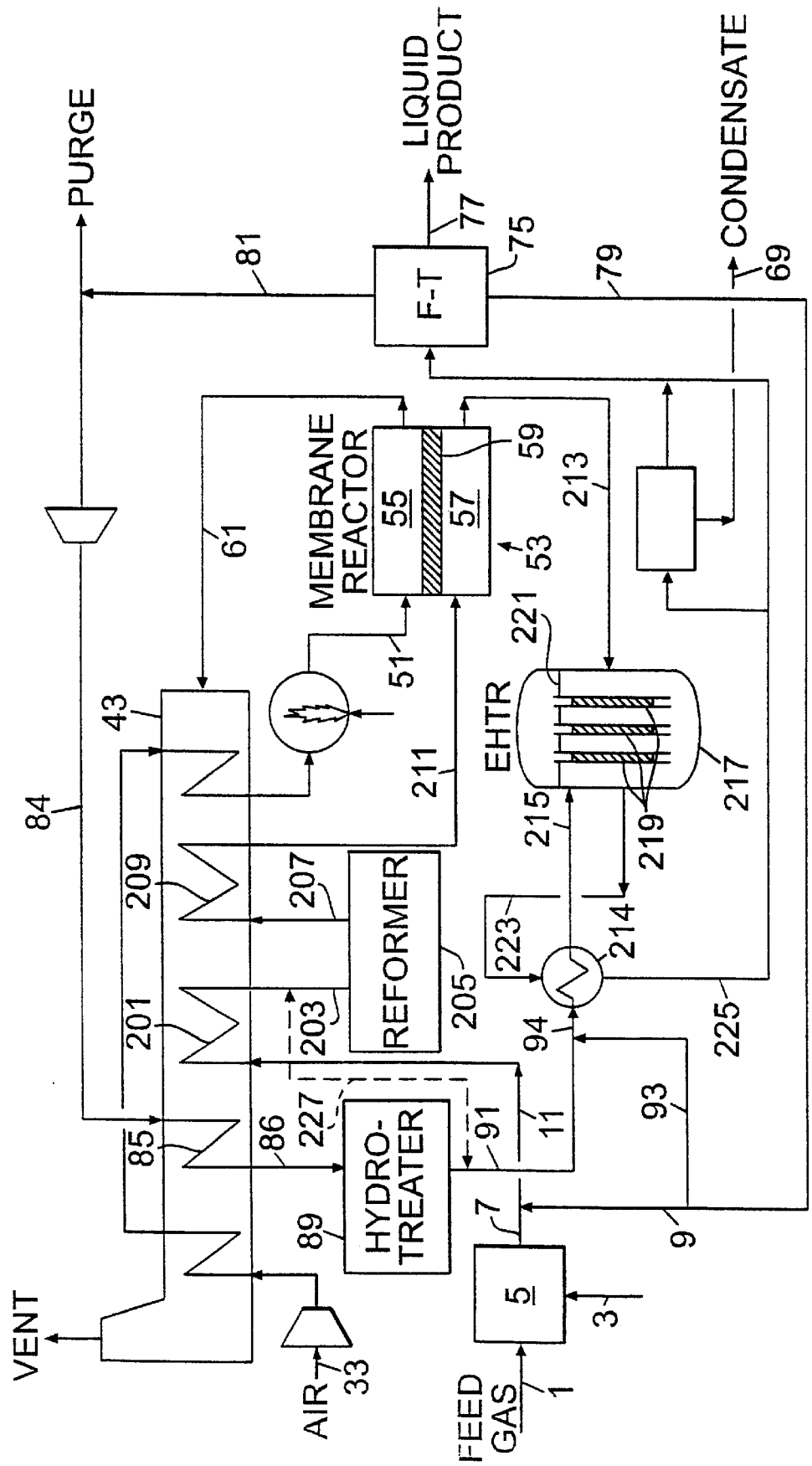
FIG. 2 is a schematic flow diagram of an alternative embodiment of the present invention which utilizes steam reforming in combination with a mixed conducting membrane reactor for the generation of synthesis gas and its conversion to hydrocarbons in a Fischer-Tropsch hydrocarbon synthesis process.

An alternative embodiment of the invention is illustrated in FIG. 2. Feed gas 1 is a natural gas which is predominantly methane with lower concentrations of heavier hydrocarbons, organic sulfur compounds, hydrogen sulfide, and non-combustible components such as carbon dioxide and nitrogen. As discussed earlier, the term natural gas as used here includes gas produced exclusively from gas fields, or gas associated with crude oil production, or combinations of the two.

Feed gas 1, preferably natural gas, is adjusted in pressure to about 100–700 psig (6.9 to 48.3 barg), preferably 200–400 psig (13.8 to 22.6 barg). Feed gas 1 at the desired pressure and hydrogen-containing gas 3 are introduced into desulfurization system 5 in which the gas is heated and organic sulfur compounds are catalytically hydrogenated to hydrogen sulfide and any olefins present are converted to paraffins. Hydrogen sulfide is removed by a suitable sorbent such as zinc oxide. Desulfurized feed gas 7 is mixed with steam 9 to yield feed 11 having a steam-to-carbon molar ratio of greater than 0.4, preferably 1.0–3.0. Feed 11 is further heated to about 800° F. to 1022° F. by heat exchanger 201 in heat exchange zone 43 against hot oxygen-depleted non-permeate 61 as described in the earlier discussion of FIG. 1.

Further heated feed gas 203 is introduced into adiabatic catalytic reformer 205 in which the feed gas is partially reformed by reactions of steam and hydrocarbons as described by reactions (4), (6), and (10) presented earlier. This reformer is defined as adiabatic because no heat is transferred to or from the reactor during operation. Partially reformed gas 207 containing methane, hydrogen, carbon oxides, and water is further heated in heat exchanger 209. Heated partially reformed feed gas 211 is introduced into reactant side 57 of mixed conducting membrane reactor 53. Heated oxidant 51, which is obtained from oxygen-containing gas 33 as described earlier with reference to FIG. 1, is introduced into oxidant side 55 of mixed conducting membrane reactor 53.

Mixed conducting membrane reactor 53 having oxidant side 55 and reactant side 57 was described earlier with reference to FIG. 1 and operates in the same manner. Hot oxygen-depleted non-permeate 61 and hot raw synthesis gas product 213 are withdrawn from mixed conducting membrane reactor 53 at the conditions earlier described.

Compressed offgas 84 is heated in heat exchanger 85, and heated compressed offgas 86 is treated or converted in hydrotreater 89 to saturate the olefins present as earlier described with reference to FIG. 1. The various hydrogenation options described therein are all relevant, except that a natural gas bleed to keep a NiMo catalyst sulfided is not explicitly shown in FIG. 2. Hydrotreated recycle gas 91 is combined with steam 93, and combined stream 94 is further heated in heat exchanger 214. Stream 215, which is combined heated hydrotreated recycle gas and steam, is introduced into enhanced heat transfer reformer (EHTR) 217 in which the $H_2$, CO, $CO_2$ and $H_2O$ present in the recycle gas re-equilibrate in accordance with the shift reaction (6) and its reverse, generally in a manner that increases the $CO/CO_2$ molar ratio. Additionally, hydrocarbons present in the offgas and any other hydrocarbons present are reformed with steam to yield hydrogen and carbon oxides.

Enhanced heat transfer reformer 217, shown schematically, is a type of heat exchange reformer known in the art in which reforming catalyst is contained in open-ended tubes 219 which are installed in partition or bulkhead 221 such that combined recycle gas and steam 215 passes through the catalyst in the tubes while heat for the reforming reactions occurring therein is provided by heat transfer from hot gas flowing over the outside of the tubes. In this case, the hot gas is provided by mixing the hot raw synthesis gas product 213 which is introduced into enhanced heat transfer reformer 217 at an appropriate location with the hot reaction products leaving tubes 219. Reformed effluent from open-ended tubes 219 thus mixes with raw synthesis gas product 213 within enhanced heat transfer reformer 217, the combined gas cools, and combined synthesis gas product stream 223 is withdrawn therefrom.

Enhanced heat transfer reformer 217 is shown schematically in simplified form to illustrate the unique characteristic of this reactor, namely that the reformed product and the gas providing heat to the reactor are mixed therein and are withdrawn as a combined stream. This is a useful configuration when such a combination is required. The actual internal design of an enhanced heat transfer reformer is of necessity more complex than that shown in FIG. 2, and such designs are known in the art. A description of a representative enhanced heat transfer reformer is given in U.S. Pat. No. 4,919,844.

Combined synthesis gas product stream 223 is cooled while providing the heating duty of heat exchanger 214 earlier described to yield cooled synthesis gas product stream 225. Further treatment to cool synthesis gas product 225 and removal of water therefrom is carried out as described with reference to FIG. 1. The operation of Fischer-Tropsch hydrocarbon synthesis and processing zone 75 as earlier described includes all process steps required to convert synthesis gas to a liquid hydrocarbon products by methods known in the art. Hydrocarbon synthesis and processing zone 75 includes one or more of the following process equipment: catalytic reactors, reactor cooling systems, catalyst handling and catalyst-wax separation systems, reactor product cooling and separation systems, reactor feed heating systems, hydrocracking and hydrotreating reactors, and condensate handling and steam generation systems.

The main effluent streams from processing zone 75 are liquid hydrocarbon product 77 which contains $C_5$ to $C_{19}$ hydrocarbons suitable for pumping and transportation to a site for further fractionation and processing into final products; recycled water 79 as described with reference to FIG. 1, and offgas 81 comprising components selected from hydrogen, carbon monoxide, carbon dioxide, methane, saturated light hydrocarbons typically up to $C_4$, and olefinic light hydrocarbons. The treatment and utilization of offgas 84 was described earlier for the embodiment of FIG. 1. The dashed two-headed line 227 in FIG. 2 represents a cross-tie through which either some heated natural gas from stream 203 can be processed in EHTR 217 or some of recycle gas 91 can be processed in reformer 205 prior to mixed conducting membrane reactor 53.

Alternative methods can be used for heating steam-methane feed 11, compressed offgas 84, and partially reformed gas 207. Instead of utilizing heat from oxygen-depleted non-permeate 61, any of these streams can be heated by indirect heat exchange (not shown) with final synthesis gas product 223.

The general characteristic of the embodiment of FIG. 2 is that hydrotreated recycled offgas 215 and heated partially reformed feed gas 211 are converted into synthesis gas by parallel operation of enhanced heat transfer reformer 217 and mixed conducting membrane reactor 53. Final synthesis gas product 223 is a combination of reaction products from each of the two different synthesis gas generation methods. The heat generated in mixed conducting membrane reactor 53 is used efficiently in enhanced heat transfer reformer 217.

The Fischer-Tropsch reactions are numerous and have been widely studied in the art. The wide range of reaction products include major amounts of paraffinic hydrocarbons and smaller amounts of olefinic hydrocarbons, alcohols, acetic acid, and other oxygenated compounds. The F-T process generates one mole of water for each mole of CO converted; this water is formed as a vapor in the F-T reactor, but must be cooled and condensed to separate it from the offgas and hydrocarbon product (described later). The aqueous condensate contains oxygenated byproducts of the F-T reactions. The F-T process also generates 72,000 Btu for each lbmole of CO reacted to hydrocarbons. In typical commercial practice, the reactor is cooled by evaporating degasified boiler feed water to steam within cooling coils in the reactor, and this heat removal requires the vaporization of roughly four moles of water per mole of CO reacted to hydrocarbons. In one preferred embodiment of this invention, a portion of such steam raised is utilized as process steam 9 and 93 of FIGS. 1 and 2; the liquid water fed to the coils is a portion of condensate such as a portion of syngas condensate 69, but suitably degasified as in commercial practice. In this case the steam would not contain oxygenated hydrocarbons.

In another embodiment, oxygenate-containing water generated as a F-T byproduct is used to provide a portion of the liquid water feed to the cooling coils—this water would not be degasified to limit environmental emissions. The remaining portion of the required water to the cooling coils can be obtained from a portion of syngas process condensate 69 (FIG. 1), but without degasification. In this case, the oxygenates are consumed to extinction in GHR 23 (FIG. 1) or EHTR 217 (FIG. 2). Various permutations and combinations dictated by the water and energy balance of the system are possible.

The F-T reactions are carried out in various kinds of reactors (slurry, trickle-bed, fluidized beds) using Fe or Co catalysts at 180–350° C. (356–662° F.). While F-T reactions have been carried out at ambient pressures, equilibrium towards desired products, reaction rate and throughput are favored by higher pressures—the range 5–20 atm has been termed "medium pressure synthesis". At high temperatures, the probability of hydrocarbon chain growth, $\alpha$, is low—that is, the molecular weight of the hydrocarbons synthesized is skewed towards the low side. Also, the olefin/paraffin ratio tends to be higher. Olefinic light hydrocarbons can be recycled internally to the F-T reactor in which they can either hydrogenate to the paraffin with the same carbon number (undesirable) or oligomerize (desirable). Alternatively, the olefins can also be oligomerized externally after separation.

Low F-T temperatures contribute to high $\alpha$—that is, the molecular weight distribution is skewed towards higher molecular weight hydrocarbons. In order to keep the final hydrocarbon product pumpable, the waxy portions of the F-T reactor products ($C_{19}$+) are selectively mildly hydrocracked to lower molecular weight hydrocarbons ($C_5$–$C_{18}$). This approach is the preferred option for F-T operation to utilize the features of the present invention.

The waxy F-T product precludes the use of fluidized beds (the particles would simply agglomerate), so that trickle bed (packed bed reactor) or slurry bubble column reactors must be used. The trickle bed reactor is easier to scale up, but offers less economy of scale relative to the other reactors. Temperature control is critical, and trickle bed reactors require a substantial recycle of product gas to enhance heat transfer. Such recycle increases overall conversion, both of CO/$H_2$ as well as hydrogenation/oligomerization of olefins. In contrast, slurry reactors have excellent temperature control since the turbulent slurry is an excellent heat transfer medium. Recycle of product gas would limit the throughput of the reactors, and is to be avoided or minimized. Increased per pass conversion can be obtained through two slurry reactors in series. Each reactor needs cyclones and filters for catalyst and wax separation; the packed trickle bed reactor, of course, does not have this problem.

Some CO is unavoidably converted to $CO_2$ and $H_2$ in the F-T reactor. The amount of CO converted in the reverse shift reaction is favored by Fe versus Co catalysts, high conversion levels and higher temperatures. Even though the preferred practice of the current invention is with high CO conversions, the use of Co catalysts and low FT temperatures limits the conversion of CO to $CO_2$. The mixed phase F-T product is recovered as two phases at near reaction temperature and pressure in a hot separator vessel. The waxy liquid from the bottom is decatalyzed (if necessary) and pumped into a hydrotreater. The vapor is decatalyzed and further cooled to ambient temperature where it separates into three phases in a cold separator. The gaseous phase contains essentially all the unreacted or shifted $H_2$, $CO_2$, CO, and low molecular weight hydrocarbons.

A preferred feature of the present invention is that no pressure reduction is required for any vapor-liquid based separation for this gas, and the residual gas is retained substantially at the synthesis gas pressure minus any pressure drop in the system. This makes recycle to the synthesis gas generating system as described above very attractive when compared with the recovery of F-T offgas at ambient pressure. In this latter case, the resulting compression costs would make recycle economically less desirable, and use of this gas as a fuel would generate undesirable $CO_2$ emissions and waste the chemical value of the hydrogen by burning it as a fuel. It is thus a preferred embodiment of the present invention that F-T offgas be recovered under pressure for recycle as discussed earlier. A less desirable embodiment would use this gas as gas turbine fuel to meet the power needs of a standalone remote facility.

The hydrocarbon phase from the 3-phase cold separator constitutes part of the hydrocarbon liquid product, and some oxygenates and olefins may be retained in this fraction. The product may be mixed with crude oil and ultimately refined into fuel products, or may be refined directly. The aqueous phase from the cold separator contains most of the oxygenates, and needs to be treated prior to discharge.

Preferably, this condensate is vaporized by excess F-T heat of reaction and recycled to the synthesis gas generation system as described below.

The waxy raffinate from the hot separator is treated in a hydrocracker, which is a trickle bed reactor packed with a dual functional catalyst. Conditions are mild (425–710 psia and 570–660° F.). The heavier paraffins crack at a much faster rate relative to the lighter paraffins, which controls the excessive formation of lights—the waxes are converted essentially to the $C_5$–$C_{19}$ range. The product distribution forms a bell-shaped curve—terminal bond fracture fragments are the least abundant, central bond fracture fragments have the maximal representation. The per pass wax conversion is limited to about 70%. The product is flashed and phase separated at a lower pressure and suitable temperature, and the liquid containing essentially all the waxy ($C_{20}$+) components is pumped back to the hydrocracker for reaction to extinction.

The vapor product is cooled to ambient temperature, and optionally phase separated (not shown in FIG. 1) if it is desired to profitably use the hydrogen-rich cold offgas (such as recycle to the hydroprocessor). Otherwise it is mixed with the liquid hydrocarbon phase from the 3-phase cold separator, and then degasified at ambient pressure. The liquid from this final phase separator is the liquid hydrocarbon product with a large portion of the heating value of the natural gas feed retained in a pumpable $C_5$–$C_{19}$ fraction for transportation or transmission to remote facilities for further fractionation into value-added fuels.

Hydrogen for the hydroprocessor may be obtained from a small slipstream of either synthesis gas 73 or offgas 81. In either case, this slipstream also serves as a purge stream to supplement purge stream 82. These slipstreams can contain substantial amount of carbon oxides, and would be available at pressures that would typically require compression to the hydroprocessor pressure. To minimize the size of the compressor, as well as maximize the hydrogen partial pressure in the hydroprocessor, it would be desirable to reject most of the carbon oxides using a pressure swing adsorption (PSA) system. To maximize the recovery of the PSA system, purity requirements on the recovered hydrogen can be relaxed, preferably to about 95%. If the synthesis gas is used for hydrotreating, the CO content of this gas optionally can be shifted to make additional hydrogen to the PSA. If the hydrogen treating rate to the hydroprocessor substantially exceeds its consumption therein, it may also be desirable to recycle residual hydrogen local to the hydroprocessor. Otherwise all low-pressure flash gases from the liquid product degasification stages, as well as the PSA purge gases, would be vented or flared to the atmosphere; in a low α, high conversion F-T cycle, these gases would represent <5% of the heat content of the natural gas feed 1. Optionally, the flash gases can be used in a fired heater to preheat various hydrocarbon streams in the synthesis gas generation section.

The Fischer-Tropsch process for synthesis gas conversion to hydrocarbons is highly exothermic, generating about 72,000 Btu/lbmole of CO reacted, representing about 19% of the natural gas feed in heating value. This is conventionally removed by heat exchange to raise steam. The steam is in turn used to drive machinery, such as the main air compressor for the air separation plant that supplies oxygen to a conventional synthesis gas generation section. With the mixed conducting membrane reactor of the present invention, air compression requirements are modest—a 10 psig blower (blower 35 of FIG. 1) may be required. However, the amount of steam generated in the F-T process is sufficient to supply the synthesis gas generation section up to a steam-to-carbon molar ratio of about 4.0. The steam-to-carbon molar ratio required by the syngas generation section typically is 1.0 to 3.0, depending on the type of reforming systems used therein. Thus an important embodiment of the present invention is to use most of the F-T steam as process steam in the synthesis gas generation system using a specific combination of system pressure and F-T reaction temperature.

The pressure of the F-T water 79, when produced as steam, cannot exceed the saturation pressure at the F-T reaction temperature—145 psia at 356° F., and 2400 psia at 662° F. When this steam is used as process steam for synthesis gas generation as described above, this dictates the synthesis gas generation pressure. Table 1 below shows the operating temperature and pressure of various commercial F-T reactors, and also the maximum possible steam pressure (the saturation pressure of water at the indicated F-T reactor temperature). Actual steam pressure would be somewhat lower due to temperature driving forces needed in the reactor. If this steam is used as process steam (not currently practiced commercially), the last column in Table 1 indicates whether synthesis gas compression is required after allowing approximately 150 psid pressure drop in the system. It is desirable to minimize synthesis gas compression into the Fischer-Tropsch reactor.

From Table 1 it is evident that factors reducing the need for compression are low F-T pressures and/or high F-T temperatures. Table 1 also indicates that it is possible to use F-T steam as process steam by slight adjustment of the F-T reaction pressure to a lower value within the medium pressure synthesis range of 5–20 atm. The lower synthesis gas generation pressure enhances methane conversion. Reducing F-T pressure will reduce productivity. The more unfavorable selectivity towards low MW hydrocarbons is counterbalanced by the low synthesis temperature.

TABLE 1

| | Commercially Practiced | | Preferred in Present Invention | |
| --- | --- | --- | --- | --- |
| Technology | F-T Temperature | F-T Pressure | Steam Saturation Pressure @ F-T Temperature (psia) | Synthesis gas compression? |
| SASOL trickle beds | 220–240° C. (428–464° F.) | 27 bar (391.5 psia) | 336–486 | Yes |
| SASOL Slurry | 240° C. | ~20 atm (294 psia) | 486 | ? |
| SASOL Fixed Fluidized Bed | 280–320° C. (550–608° F.) | 392 psia | >1045 psia | No |
| Shell trickle bed | 200–230° C. (392–446° F.) | 20–40 bar (290–580 psia) | 226–406 psia | Yes |

Aqueous F-T effluent contains alcohols and other oxygenates as earlier described, and this F-T water can be used in part to provide feed water to the steam system which cools the F-T reactor(s). This steam will contain oxygenates, and if used as process steam, the oxygenates will react to extinction in the synthesis gas generation section. Net water rejection from the overall process occurs via synthesis gas process condensate 69 in FIG. 1, which is relatively clean and can be treated or reused readily by known methods. In one embodiment, this water can be revaporized but unmixed with oxygenated water, for example in certain selected F-T reactors; the steam thus generated can be used for expander drives which exhaust steam to the atmosphere, thereby rejecting water from the overall process (see Example 1).

The aqueous F-T condensate does contain dissolved $CO_2$ and organic acids. The cooling coils in the F-T system are fabricated to handle these acidic byproducts (but not necessarily as an aqueous phase) in the reaction side. The F-T steam drum, pumps and other wetted system parts need upgraded metallurgy similar to the coils. In an alternative embodiment, this condensate can be vaporized in direct contact with heated feed hydrocarbon in a counter-current vapor liquid contactor, known as a saturator. This alternative displaces usage of F-T steam as process steam. The vapor pressure of this oxygenated aqueous liquid will be different than that for pure water.

EXAMPLE 1

This Example illustrates a process for making liquid hydrocarbons from a natural gas feed containing very little $CO_2$ using a mixed conducting membrane reactor and many of the integration concepts earlier described. In this Example, 65.3% of the 4748 million Btu/hr higher heating value (HHV) contained in the natural gas feed is recovered in 151,000 lb/hr of liquid hydrocarbon product containing 3101 million Btu/hr HHV. Higher heating value is the heat available by combustion of a hydrocarbon. The liquid hydrocarbon product is essentially a $C_5$-$C_{19}$ hydrocarbon mixture containing some dissolved waxes and having a Reid vapor pressure of about 15 psid.

Figure 3:
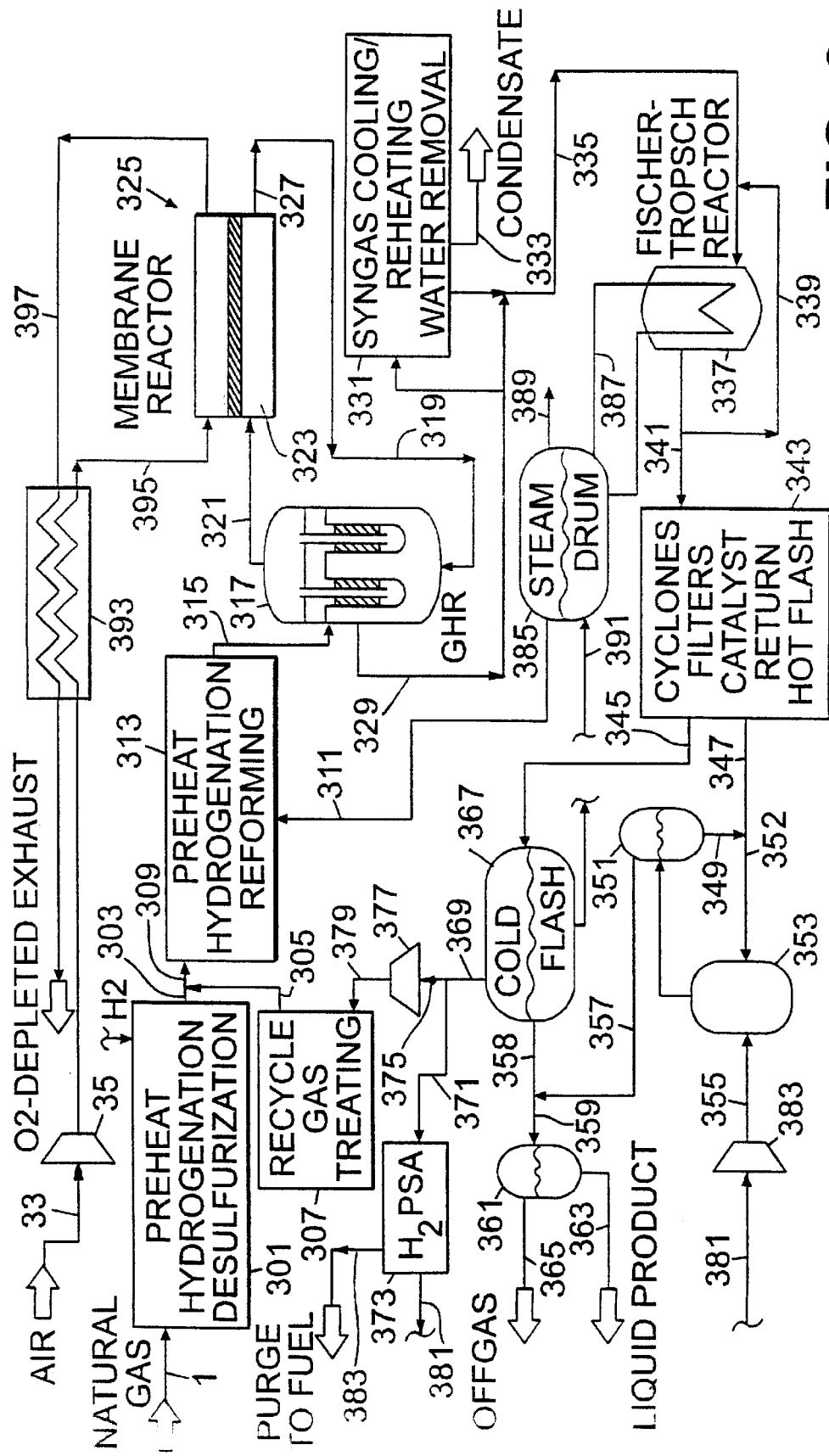
FIG. 3 is a schematic flow diagram of an alternative mode of the present invention as illustrated by Example 1.

Referring to FIG. 3, feed natural gas 1 at >400 psia is preheated to about 700° F., hydrogenated, and desulfurized in gas processing zone 301. The resulting treated gas 303 is mixed with compressed recycle gas 305 from the F-T synthesis and processing zone. Compressed recycle gas 305 is pretreated before mixing in recycle gas treatment system 307 to remove $C_8^+$ hydrocarbons. The molar flow of recycle gas 305 divided by the molar flow of feed gas 1 is about 1.6. Combined feed and recycle stream 309 and saturated steam 311 at 350 psia (S/C 2.7) is introduced into reforming reactor system 313 in which it is further heated to 800° F. and fed to an adiabatic catalytic reforming reactor. Hydrocarbons heavier than methane are converted to methane, traces of olefins are hydrogenated, and substantial methanation occurs as the reverse of reaction (4) given above. The reactions which occur are net exothermic. Reaction effluent 315, which contains methane, hydrogen, carbon oxides, and water, exits reforming reactor system 313 at or somewhat above 928° F.

Reaction effluent 315 is introduced into gas heated reformer (GHR) 317 in which partial reforming occurs, thereby increasing the concentration of hydrogen and carbon oxides. Heat for the endothermic reforming reactions is provided within the reactor by indirect heat transfer with hot process gas stream 319 (later defined). Partially reformed gas stream 321 is withdrawn at about 1225° F., and is close to reforming equilibrium. The GHR accounts for about 24% of the eventual methane conversion in the overall synthesis gas generation step. The heat transfer duty in the GHR is 480 million Btu/hr, which is about 10% of the higher heating value of the natural gas feed 1.

Partially reformed gas stream 321 is introduced into reactant side 323 of mixed conducting membrane reactor 325 and undergoes oxygenative reforming as earlier described. Raw synthesis gas product 327 is withdrawn from the reactor at 1742° F. and provides hot process gas stream 319 to GHR 317 as earlier described. Raw synthesis gas product 327 has a molar $H_2/CO$ ratio of about 2.3 and contains about 20 mole % $CO_2$. Cooled raw synthesis gas stream 329 is withdrawn from GHR 317 at about 1200° F. As raw synthesis gas cools, it crosses into the Boudouard carbon formation zone at about 1400° F. Metal dusting corrosion is minimized (both within the GHR and external heat exchangers hotter than ~800° F.) by suitable metallurgy as discussed later. At least a portion of cooled raw synthesis gas stream 329 is further processed in gas conditioning zone 331, where it is used to preheat various feed streams and finally to preheat boiler feed water. After final cooling using ambient air or water to condense out most of the water as condensate 333, final synthesis gas product 335 is withdrawn for further processing in F-T reactor 337.

Final synthesis gas product 335 is mixed with recycle gas 339, preheated (not shown), and fed to F-T reactor 337. The F-T reactor operates at 464° F. and 240 psia. About 91 mole % of the CO in the F-T feed is converted in the reactor; about 6% is converted to $CO_2$ and about 85% to hydrocarbons with an a of ~0.95. The parameter α is the Anderson-Shultz-Flory probability of hydrocarbon chain growth. Mixed gas and liquid reactor product 341 is treated in raw product conditioning system 343 which removes entrained catalyst and separates the product into raw gas product 345 and raw liquid product 347 essentially at the F-T reactor pressure and temperature.

Raw liquid product 347 is mixed with recycled wax stream 349 from wax separator 351 and combined stream 352 is fed to hydrotreating reactor 353 operating at 615° F. and 550 psia. Hydrogen stream 355 also is introduced into the reactor, which is a trickle bed reactor packed with a dual functional catalyst. The heavier paraffins crack at a much faster rate relative to the lighter paraffins, which controls the excessive formation of light hydrocarbons: the waxes are converted essentially to the $C_5$–$C_{19}$ range. The product distribution forms the well-known bell-shaped curve in which terminal bond fracture fragments are the least abundant and central bond fracture fragments are the most abundant. The wax conversion per pass is limited to about 70%.

Hydrotreated product is separated in wax separator 351, and the unconverted wax in recycled wax stream 349 is reacted to extinction in hydrotreating reactor 353. Vapor 357 from wax separator 351 is cooled to 100° F. (not shown), combined with liquid 358 (later defined), and flashed in separator drum 361 to yield liquid hydrocarbon product 363 and low pressure offgas 365.

Raw gas product 345 is cooled to 100° F. (not shown) at pressure of about 190 psia and introduced into cold flash vessel 367. Hydrocarbon-rich liquid 358 is withdrawn therefrom, and oxygenated aqueous condensate 391 is also withdrawn and processed as described later. Vapor offgas 369 is withdrawn therefrom, a vapor portion 371 is sent to hydrogen pressure swing adsorption (PSA) system 373, and the remaining offgas 375 is compressed to 400 psia. Compressed offgas 379 is treated in recycle gas treatment system 307 to remove $C_8^+$ hydrocarbons as earlier described to provide compressed recycle gas 305. Pressurized hydrocarbon liquid 358 is mixed with the cooled fluid 357 as earlier described.

Hydrogen pressure swing adsorption (PSA) system 373 recovers about 75% of the hydrogen in vapor portion 371 to provide hydrogen stream 381, which is compressed in compressor 383 to provide hydrogen stream 355 for use in hydrotreating reactor 353 as earlier described.

The total higher heating value (HHV) of low pressure offgas 365 and PSA purge gas 383 is about 4% of the HHV in feed gas 1, while compressed offgas 379 represents 26% of the HHV in feed gas 1.

The exothermic reactions in F-T reactor 337 generate 46,000 lbmoles/hr of saturated steam at 350 psia by use of steam circuit 387 and steam drum 385. This steam contains the equivalent of 20% of the HHV of feed gas 1. 38,000 lbmoles/hr of this steam provides process steam 311 for the synthesis gas generation step, and 39,000 lbmoles/hr of water is recovered in process condensate 333. The remainder 8,000 lbmoles/hr of F-T steam as stream 389 is available to provide about 7.6 MW for driving various machinery in the process plant.

F-T reactor 337 also generates 11,000 lbmoles/hr of water product containing $CO_2$ and oxygenated hydrocarbons recovered as condensate 391. This water is routed to steam drum 385 along with 27,000 lbmoles/hr of acidic process condensate as a portion (not shown) of condensate 333. Together, these streams account for 38,000 lbmoles/hr of the 46,000 lbmoles/hr overall coolant steam requirement in the F-T reactors. The remaining 8,000 lbmoles/hr of F-T coolant requirement is met by a different portion of the acidic process condensate alone (without admixture with F-T aqueous product) is used to generate drive steam alone in a few of the F-T reactors/cooling coils. The acidic, but oxygenate-free drive steam can be vented to the atmosphere after power extraction, and with the remaining 4000 lbmoles/hr of process condensate represents the total water export from the facility.

Referring again to FIG. 3, air 33 is compressed in blower 35 to 10 psig and preheated to 1225° F. in heat exchange zone 393 to provide heated air feed 395 to the oxidant side of mixed conducting membrane reactor 325. Optionally, heated air feed 395 can be further heated in a directly-fired burner (not shown) wherein the total combustion products enter the oxidant side of mixed conducting membrane reactor 325; such a burner would be required for startup. 90% of the oxygen in heated air feed 395 is recovered, representing an oxygen recovery rate of 7552 lbmoles/hr. Hot oxygen-depleted air 397 is cooled in heat exchange zone 393 to provide heat for heated air feed 395. Air compression in blower 35 requires about 10 MW, offgas compression in compressor 377 requires about 7 MW, and other compressors, pumps and equipment require about 2 MW.

The hot synthesis gas exiting mixed conducting membrane reactor 325 is relatively CO-rich. Its composition is characterized by a high temperature limit for Boudouard carbon formation of 1400° F. in this example. Above 1400° F., this gas cannot cause metal dusting corrosion, but if the gas contacts susceptible metals with a metal temperature <1400° F., metal dusting corrosion can occur. Metal dusting is possible within GHR 317, and must be addressed by metallurgical techniques known in the art.

Warm synthesis gas 329 exiting GHR 317 is at about 1200° F., and can cause similar corrosion in heat exchangers downstream to a temperature of about 800° F. Below 800° F., metal dusting is not significant. In this Example, the preheat duties of the hydrocarbon feed streams were provided by indirect heat exchange with GHR raw synthesis gas stream 329 (not shown in FIG. 3). Alternatively, many conventional plants accomplish preheat in a separate fired heater. The efficiency of the process is equivalent if the fired heater is fired only by low pressure F-T fuel gases that would otherwise be flared. As mentioned earlier in Example 1, 182 million Btu/hr of LP fuel gas is available for this purpose. Of course, the hot synthesis gas still must be cooled. Conventional plants utilize a process waste heat boiler at this point to make steam—the high boiling heat transfer coefficients keep the metal heat exchanger surfaces close to the temperature of the boiling water and below the 800° F. metal dusting limit, independent of the synthesis gas temperature. This would add to the steam/energy surplus of the overall process. Another method is to simply quench the hot synthesis gas by direct physical contact with a fluid, such as water.

EXAMPLE 2

Figure 4:
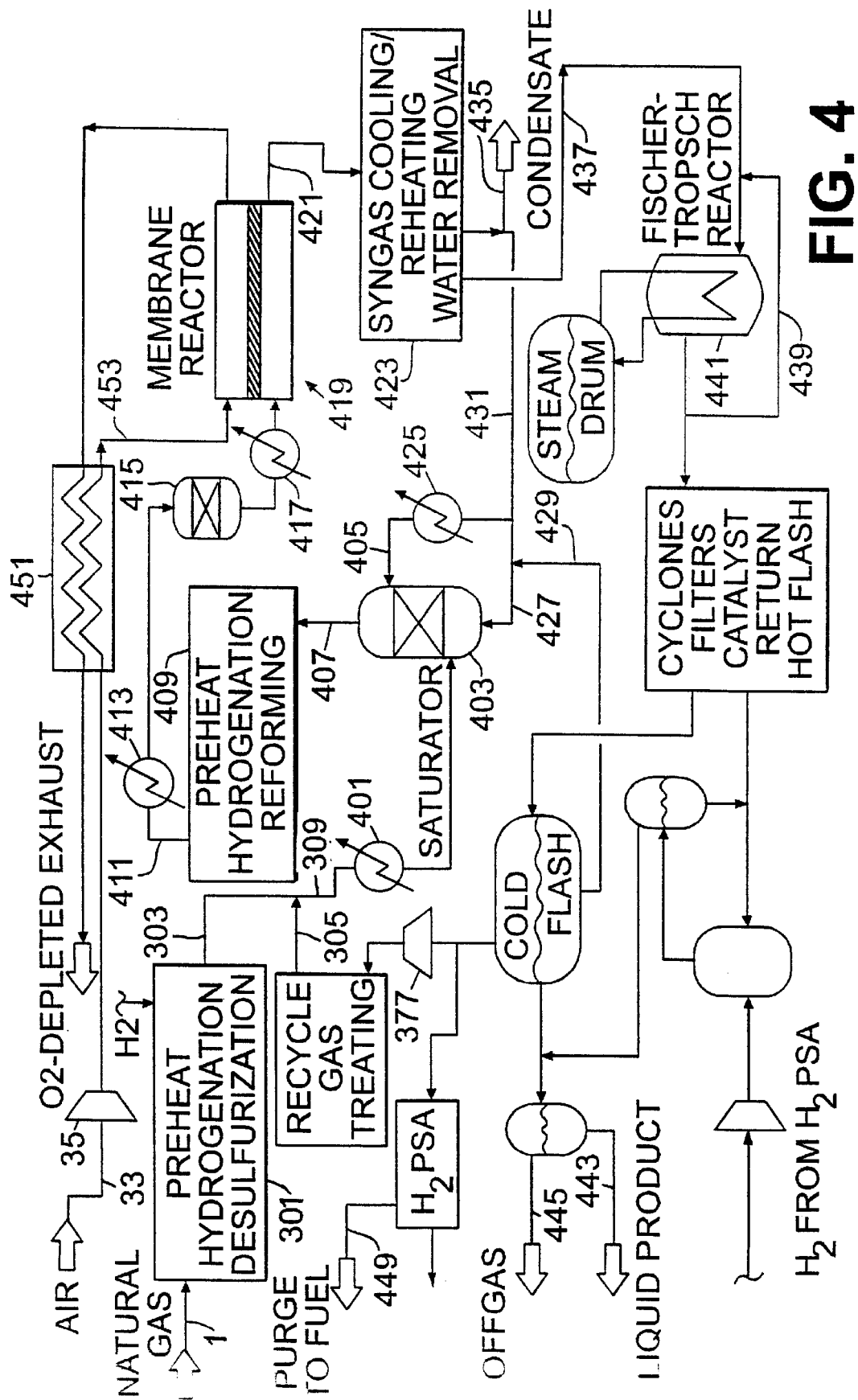
FIG. 4 is a schematic flow diagram of another alternative mode of the present invention as illustrated by Example 2.

This Example illustrates the use of an adiabatic reformer to preform the feed to a mixed conducting membrane reactor in which the reformer utilizes a steam-to-carbon molar ratio of about 1.4. Referring to FIG. 4, natural gas feed 1 at >400 psia is preheated to about 700° F., and is hydrogenated and desulfurized in gas processing zone 301 as described in Example 1. The resulting treated gas 303 is mixed with compressed recycle gas 305 from the F-T synthesis and processing zone. Combined feed and recycle stream 309 is heated in heater 401 and introduced into saturator 403 where it is contacted with recirculating hot aqueous condensate stream 405 obtained from both the synthesis gas cooling zone and the F-T reaction system as described later. The gas is moisturized to attain a steam-to-carbon molar ration of 1.4; in addition, the $CO_2$ and oxygenates present in F-T aqueous condensate are transferred to the feed gas stream. Saturated gas 407 is fed to reforming reactor system 409 in which it is further heated to about 800° F. and introduced to an adiabatic catalytic reforming reactor. Hydrocarbons heavier than methane are converted to methane, traces of olefins are hydrogenated, and substantial methanation occurs as earlier discussed; these reactions are net exothermic. Reaction effluent 411, which contains methane, hydrogen, carbon oxides, and water, exits reforming reactor system 409 at or above 930° F.

Reaction effluent 411 is further heated in heater 413 to about 1200° F. and is introduced into adiabatic catalytic reforming reactor 415 (alternatively termed a prereformer). In this reactor, some methane is converted to synthesis gas, and the temperature drops to about 1066° F. The reactor effluent is reheated to about 1200° F. in heater 417 and is introduced into mixed conducting membrane reactor 419 and undergoes oxygenative reforming as earlier described. The total heat transfer duty in heaters 413 and 417 is about 200 million Btu/hr—4% of the higher heating value of the natural gas feed 1. Hot raw synthesis gas product 421 exits reactor 419 at 1742° F. and has a $H_2/CO$ molar ratio of 2.17 and a $CO_2$ concentration of 13.7 mole %.

Hot raw synthesis gas 421 optionally is cooled by heating hydrocarbon streams in various preheat exchangers as indicated generically by synthesis gas processing zone 423. As the gas cools, it crosses into the Boudouard carbon formation zone at about 1475° F. Metal dusting corrosion may occur as this gas cools, as will be discussed later. The synthesis gas product also is used to reheat the recirculating water from saturator 403 in heat exchanger 425, thereby indirectly providing heat for vaporization of water in the saturator. In this case, saturator bottoms stream 427 at approximately 370° F. is mixed with makeup condensate 429 from the F-T system (discussed below) and additional condensate 431 from synthesis gas cooling zone 423, pumped to 600 psia (not shown), heated to 450° F. against cooling synthesis gas in heat exchanger 425 as described above, and introduced as stream 405 into the top of saturator 403. The flow ratio of recirculation water 405 to the water contained in saturated feed 407 is preferably about 7:1 to satisfy the required latent heat of vaporization.

The synthesis gas product is further cooled in synthesis gas processing zone 423 to preheat F-T boiler feed water. The cooled synthesis gas flows to a hot flash separator and warm condensate 431 is withdrawn and added to the saturator 403 recirculation loop to provide a portion of the makeup water. The remainder of the makeup water is provided by cold condensate 429 from the F-T plant cold separator (described later). After a final cooling using ambient air or water to condense most of the water which is withdrawn as condensate 435, final synthesis gas 437 is ready for further processing.

Final synthesis gas 437 is preheated (not shown) and fed to F-T reactor 441. The F-T reactor, product separation, product treatment, and recycle gas treatment are carried out as described in Example 1 to yield final liquid hydrocarbon product 443, low pressure offgas 445, and purge gas 449.

The F-T reactor generates 46,000 lbmoles/hr of saturated steam at 350 psia which contains the equivalent of 18.5% of the higher heating value of feed gas 1. Essentially all of this saturated steam (which is free of oxygenates) is available for driving machinery. Expanding this steam to ambient pressure in a steam turbine would generate 42MW of drive power—more than twice the plant requirement. About 13,000 lbmoles/hr of the F-T steam can be vented as vapor and the rest must be condensed.

Makeup condensate 429 at 11,000 lbmoles/hr, which contains $CO_2$ and oxygenates, provides makeup to the saturator along with about 10,000 lbmoles/hr of condensate 431 from synthesis gas processing zone 423. A total of 21,000 lbmoles/hr of water is required to saturate combined feed and recycle stream 309 yielding a steam-to-carbon molar ratio of 1.4. The overall oxygenative reforming process of this Example yields a total of 23,000 lbmoles/hr of condensate: 13,000 in stream 435 and 10,000 in stream 431.

Air 33 is compressed in blower 35 to 10 psig, preheated to 1225° F. in heat exchange zone to yield hot air feed 453 to the oxidant side of mixed conducting membrane reactor 419. Optionally, heated air feed 453 can be further heated in a directly-fired burner (not shown) wherein the total combustion products enter the oxidant side of mixed conducting membrane reactor 419. 90% of the oxygen in hot air feed 453 is recovered at a permeation rate through the mixed conducting membrane of 7917 lbmoles/hr. Air compression in blower 35 requires 11 MW, offgas recycle 305 recycle in compressor 377 requires 4 MW, and other compressors, pumps and equipment require 2 MW of power.

In this Example, the source of the process steam is the heat from cooling the synthesis gas product in heat exchanger 425, in contrast with Example 1, in which the source for process steam is heat from the F-T reaction itself. The F-T reaction temperature fixed the steam pressure, which in turn fixed the process pressure in Example 1 to <350 psia. In the present Example, the higher grade heat from the cooling synthesis gas can heat the saturator water 405 at a much higher pressure of 600 psia. Thus, the synthesis gas pressure in the current Example could have been 600 psia, although 350 psia was used for comparison with Example 1.

Only 61.2% of the equivalent higher heating value the feed gas 1 is recovered as liquid product 443 in Example 2 compared to 65.3% in Example 1. This occurs in spite of the lower steam-to-carbon molar ratio in Example 2 compared to Example 1. The difference lies in the effectiveness of the heat-exchanged non-oxygenative reforming in gas heated reactor 317 of FIG. 3. The heat transfer duty of heat exchangers 413 and 417 Example 2 account for only 4% of the equivalent higher heating value in feed gas 1, and only 5.7% of the overall methane conversion is accomplished in adiabatic reformer reactor 415. The lower steam-to-carbon molar ratio, reforming heat starvation, and the high $CO_2/H_2$ content in combined feed and recycle stream 309 (due to the $CO_2$ and $H_2$ in recycle gas 305) all contribute to this. At the temperatures in adiabatic reformer reactor 415, $CO_2$ and $H_2$ are the principal products of the methane reforming by water, and the presence of $CO_2$ and $H_2$ in the feed inhibits methane conversion. In commercial practice, $CO_2$ recycle or import is always introduced after an adiabatic prereformer. Thus, in the present Example 2, methane pre-conversion could be increased if feed gas 1 is preformed alone rather than in admixture with the compressed recycled gas 305 from the F-T synthesis and processing zone. The F-T offgas would still require preconditioning in a methanator to remove heavy hydrocarbons prior to mixed conducting membrane reactor 419; the temperature increase in this reactor will be substantial in the absence of natural gas admixture. Thus this approach was not considered in detail in this Example.

The main benefit of operating with a low steam-to-carbon molar ratio, as expected, is the low level of $CO_2$ in synthesis gas product 421, and the lower amount of recycle required. However, the inadequate extent of non-oxygenative reforming leads to a higher purge rate, since the recycle loop must be purged such that it contains 5% of the heating value of feed gas 1 to hold the $H_2/CO$ ratio in the F-T feed 437 to about 2.16. This is explained below.

Note that a heat exchange reformer has not been commercially demonstrated to operate at the S/C ratios of Example 2. The onset of metal dusting and Boudouard carbon laydown in Example 2 is 1475° F., compared to 1400° F. in Example 1. The latter is a much more severe application, approaching a limit (about 1490° F.) where commercial alloys that resist metal dusting are not known. It is very expensive to recover heat from cooling synthesis gas at these high temperatures in any heat exchanger other than a boiler. This also would increase the inefficiency of this process if the steam to carbon molar ratio were lowered much below 1.4.

It is clear that the processing requirements for F-T recycle gas are different than those of natural gas, e.g., for sulfur removal and olefin saturation. Particularly in a high-α F-T process such as in Examples 1 and 2, $H_2$ and CO constitute 70–90% of the offgas stream being recycled. The recycle gas needs minimal reforming, and primarily needs reverse shifting to adjust its relative $H_2/CO/CO_2$ distribution. Reverse shifting is also endothermic and is carried out effectively at high temperatures, but has 10% of the heat requirement of reforming. Thus, a parallel non-oxygenative reforming device could be used in conjunction with mixed conducting membrane reactor 419. Totally different hydrocarbon feeds, with totally different steam-to-carbon and $CO_2$-to-carbon molar ratios can be employed for maximum flexibility. One such version is the enhanced heat transfer reformer (EHTR) of FIG. 2 previously described.

Recycle gas, with $C_8^+$ hydrocarbons previously removed in a carbon bed, and olefins previously saturated in a presulfided Ni—Mo bed (without methanation) can be mixed with some desulfurized natural gas and steam and fed separately to the EHTR. Conversion proceeds in both the EHTR and mixed conducting membrane reactor 419. The hot effluent from the reforming section of the EHTR is combined with that from mixed conducting membrane reactor 419, and the mixed synthesis gas is cooled providing heat of reforming to the EHTR reforming section alone. The cooler mixed synthesis gas is the product from the synthesis gas generation section. Since the two reformates are mixed, there is one less tubesheet in the EHTR compared with the gas heated reformer (GHR) described earlier in FIG. 1. Construction and catalyst loading are simplified.

The main purpose of heat exchange reforming is achieved in a very simple and elegant manner. With a mixed conducting membrane reactor operating at a steam-to-carbon molar ratio of 1.4, the overall steam-to-carbon molar ratio of the synthesis gas preparation system can be reduced beyond that possible with a GHR. Depending on the steam-to-carbon molar ratio, methane leakage can be higher in an EHTR than the mixed conducting membrane reactor since the EHTR cannot reform to a temperature any higher than the mixed conducting membrane reactor exit temperature.

Conventional technology for oxygen based syngas generation by partial oxidation (POX) or autothermal reforming (ATR) requires an air separation unit (ASU) to generate high pressure oxygen (typically 350–950 psia of 99.5% $O_2$ requiring about 13 Kwh/STPD @350 psia). In contrast, the power consumption in the embodiment of the above Example is about 3 to 4 kwh/STPD $O_2$ permeated in the mixed conducting membrane reactor. It is estimated that a mixed conducting membrane reactor based process requires less than 50% of the power requirement of a POX or ATR process. Thus the ASU in a conventional plant is a ready sink for the F-T steam or surplus gas produced by the F-T process; however, integrations to save energy have limited potential in POX or ATR based plants.

In the preceding Example 2, the overall facility power requirement is 19 MW. The F-T steam alone can provide 42 MW of drive power expanding the steam to ambient pressure, and this would be sufficient to drive an air separation unit (ASU) of the required size if used. The F-T reactor must be cooled and air cooling is expensive; so the steam must be generated regardless of potential use for work generation.

The F-T steam represents about 20% of the energy content in the natural gas feed. Using this steam beneficially can be economically attractive, mainly if the synthesis gas generation system needs process steam. POX of natural gas needs no steam, and an ATR uses limited amounts of steam. A mixed conducting membrane reactor, on the other hand, benefits from a controlled excess of steam in the feed reactant gas by increased thermal stability of the reactor itself, control of carbon deposition on the reforming catalyst, and smaller methane leakage. Further, as described earlier, a mixed conducting membrane reactor will require an upstream reformer, or prereformer, which requires steam. An ATR and POX typically do not require an upstream reformer or prereformer. Thus, the use of a mixed conducting membrane reactor system provides a unique opportunity to utilize F-T process steam in a manner not possible in POX or ATR systems.

The use of process steam does have one drawback— considerable CO can be shifted to $CO_2$ in the synthesis gas feed and offgas from the F-T system. The resulting $CO_2$ must be recycled, otherwise the process would export a huge amount of $H_2$. $CO_2$ recycle is expensive if an acid gas removal system is required, as discussed below. The present invention allows the F-T reactor to operate with such a synthesis gas feed since the offgas can be recycled to the synthesis gas generation system without prior $CO_2$ removal. The gas is rich in H2 and $CO_2$—when these components reverse shift, they generate the $H_2/CO$ mixture, which is the objective of the synthesis gas generation system. The reverse shift reaction is mildly endothermic and is best done in a hot synthesis gas reactor; but it requires only a fraction of the heat required for reforming. The recycle gas is a sulfur free feedstock and is available at close to the F-T reactor pressure. The present invention minimizes the processing of the F-T offgas and requires less compression. The gas represents 26% of the HHV in fresh natural gas feed. Firing this gas in a gas turbine would generate 110 MW of power, much more than would be needed even in an ASU in a conventional F-T plant.

EXAMPLE 3

A feature of the invention illustrated in Example 1 is that F-T offgas can be recycled without $CO_2$ removal, that is, all components in offgas 81 are present in stream 84 which is returned for further treatment and recycle to GHR 23. An alternative is illustrated in this Example wherein most of the $CO_2$ is separated from synthesis gas product 73 of FIG. 1 by a conventional MDEA system (not shown), the recovered $CO_2$ is returned to the reactant feed to mixed conducting membrane reactor 53, and the entire F-T offgas is combusted in a gas turbine to generate electric power (not shown). In the process of Example 1, 80% of the F-T offgas 81 is recycled. Process heat and material balances were carried out for this alternative and compared with the results of Example 1.

The results of this comparison are given in Table 2. $CO_2$ recycle compression requires more power than offgas recycle via compressor 83 and the size of the $CO_2$ compressor as measured by the inlet volumetric flow is more than double that of offgas recycle compressor 83. The reason for this is that the $CO_2$ removal system yields $CO_2$ at 40 psia whereas the F-T offgas is recovered at 190 psia, only 50 psia below the F-T reactor pressure of 240 psia. In addition, the $CO_2$ removal system itself is an expensive unit operation, and requires 4 MW of power. Also, F-T offgas recycle increases the conversion efficiency of the process to 65%; when offgas is not recycled, the conversion efficiency drops to 59%, and 11% of the feed gas 1 higher heating value (HHV) is available as fuel at close to the F-T pressure. Flaring this fuel would have a substantial environmental cost. This fuel could be recycled separately to the synthesis gas generation system with additional compression.

Alternately, the fuel could be expanded first (in a turbine or engine drive) and then combusted in a package boiler. Alternately, the fuel could be used in a gas turbine, but the gas turbine power of 48 MW would far exceed the plant requirements. The F-T steam, net of process requirements, furnishes 8–9 MW of turbine power, where the exhaust is wet steam at ambient pressure (no condenser). This places the process of Example 1 under a small power deficit, but this can be met readily by known means.

The main advantages of the embodiment of Example 1 over the $CO_2$ removal and recycle option as illustrated in Table 2 are (1) a lower natural gas feed requirement; (2) a higher conversion of natural gas feed higher heating value (HHV) into liquid hydrocarbon product; (3) a lower gas compression power requirement; and (4) elimination of the capital and power costs of a $CO_2$ removal system.

TABLE 2

RESULTS OF COMPARISON OF EXAMPLE 3

| | Process of Example 1 | CO$_2$ recycle; offgas to gas turbine |
|---|---|---|
| Natural gas (NG) Feed, Million Btu HHV/hr | 4748 | 5257 |
| Liquid Hydrocarbon Product, Million Btu/hr | 3100 | 3100 |
| Liquid Hydrocarbon Product, % of NG Feed HHV | 65.3% | 59.2% |
| GHR duty, % of NG Feed | 10% | 9% |
| LP offgases to Flare, % of NGF HHV | 4% | 4% |
| Recycle Gas, % of NG Feed HHV | 26.3% | Zero |
| HP Purge to Power Generation, % of NG Feed HHV | Zero | 11% |
| Synthesis gas Flow from Membrane Reactor (wet), lb moles/hr | 95,300 | 85,500 |
| Fresh Synthesis gas Feed to F-T (dry basis), lb moles/hr | 56,600 | 41,100 |
| CO$_2$ in Fresh FT feed, dry mole % | 19.6% | 2.0% |
| H$_2$/CO in Fresh FT feed, mole/mole | 2.3 | 2.1 |
| Offgas Recycle 1 NG Feed, mole/mole | 1.56 | Zero |
| CO$_2$ Recycle/NG Feed, mole/mole | 0.83 (in offgas) | 0.73 |
| CO$_2$/C molar ratio | 0.73 | 0.71 |
| Steam/C molar ratio | 2.6 | 2.5 |
| Process Steam, lb moles/hr | 37,500 | 34,700 |
| F-T Steam lb moles/hr | 46,000 | 45,600 |
| F-T Export Steam Drive (no condenser), MW | 8 | 10 |
| F-T Offgas GT w/o HRSG (30% Heat Rate Efficiency) | 0 | 53 |
| Air Compression Power, MW | 10 | 10 |
| Acid Gas Removal Power | N/A | 4.0 |
| Offgas/CO$_2$ Recycle Compression Power | 7 | 10.5 |
| Offgas/CO$_2$ Recycle ACFH @ Compressor Inlet | 600,000 | 1,440,000 |

High or nearly complete recycle of the F-T offgas has not been disclosed in the prior art. A practical limit taught in the art is in the range of 50 to 62%; at 70% recycle and above, excessive H$_2$/CO ratios and large gas flows occur which are undesirable. In comparison, 80% of the F-T offgas 81 is recycled In the process of Example 1. The remaining 20% was entirely beneficially processed in the PSA to recover H$_2$ for wax hydrocracking; the PSA purge was the only inert gas rejection purge for the recycle loop.

EXAMPLE 4

The following example qualitatively illustrates the advantage of non-adiabatic reforming prior to the mixed conductor membrane reactor as compared with an adiabatic reformer. Two alternatives are compared here: the process of Example 1 which uses non-adiabatic gas heated reformer (GHR) 23, and the same process except that a simple non-adiabatic packed bed reformer with a small reheat coil is used in place of the GHR. Process heat and material balances were carried out and are compared in Table 3.

The main advantages of the embodiment of Example 1 over the use of an adiabatic reformer are illustrated in Table 3, namely, (1) a lower natural gas feed requirement; (2) a higher conversion of natural gas feed higher heating value (HHV) into liquid hydrocarbon product; (3) a lower gas compression power requirement; and (4) a lower recycle loop purge rate.

TABLE 3

COMPARISON RESULTS OF EXAMPLE 4

| | Example 1 (Offgas Recycle with GHR) | Offgas Recycle with Adiabatic Reforming in place of GHR |
|---|---|---|
| Natural gas (NG) Feed, Million Btu HHV/hr | 4748 | 5875 |
| Liquid Hydrocarbon Product, Million Btu/hr | 3100 | 3100 |
| Liquid Hydrocarbon Product, % of NG Feed HHV | 65.3% | 52.8% |
| Non-oxygenative Reforming duty, % of NG Feed | 10% (in GHR) | 1.7% (in reheat coil) |
| Recycle Loop Purge to Flare, % of NGF HHV | 1.7% | 4.7% |
| Synthesis gas Flow from Membrane Reactor (wet), lb moles/hr | 95,300 | 113,000 |
| Fresh Synthesis gas Feed to F-T (dry basis), lb moles/hr | 56,600 | 61,000 |
| CO$_2$ in Fresh F-T feed, dry mole % | 20% | 24% |
| H$_2$/CO in Fresh FT feed, mole/mole | 2.3 | 2.3 |
| Offgas Recycle/NG Feed mole/mole | 1.56 | 1.27 |
| CO$_2$ Recycle/NG Feed mole/mole | 0.83 (in offgas) | 0.75 (in offgas) |
| CO$_2$/C Molar Ratio | 0.73 | 0.67 |
| Steam/C Molar Ratio | 2.6 | 2.7 |
| Air Compression Power, MW | 10 | 14.7 |
| Offgas Recycle Power | 7 | 6 |
| Offgas Recycle ACFH @ Compressor Inlet | 600,000 | 594,000 |

The use of a GHR is favored over an adiabatic reactor as the non-oxygenative reformer upstream of the mixed conducting membrane reactor. The major benefit is the utilization of high grade heat available in the mixed conducting membrane reactor effluent—the GHR of Example 1 accomplished 24% of the methane conversion in the combined GHR/membrane reactor system by utilizing an amount of energy equivalent to 10% of the NG feed. 65% of the heating value of NG is captured in the liquid hydrocarbon product versus 53% in the case which uses an adiabatic reformer. The difference comes from both the heat exchange reforming and the reduced purge requirements.

Alternatively, a fired tubular reformer could be used as the non-oxygenative device parallel to the oxygenative mixed conducting membrane reactor. The disadvantage of a fired tubular reformer, however, is that it usually operates with a low radiant efficiency (<50%), and wastes energy in the hot flue gas leaving the radiant section. On the positive side, it is a ready sink for any low-pressure fuel gas such as PSA offgas, flash gas, purge gas, etc. In high conversion, high α, F-T processes, such gases are minimal (<4% in Example 1). However, if associated gas from crude oil production is used as the F-T feed gas, a fired tubular reformer becomes attractive.

Regardless of the type of non-oxygenative non-adiabatic reforming used, restricting the extent of oxygenative reforming has major benefits in the requirements for the mixed conducting membrane air handling. Air compression is reduced from 15 to 10 MW as seen in Table 3 due to the reduced oxygen requirements; there are corresponding decreases in membrane reactor and air-side heat exchanger sizes as active heat sinks. Steam also helps control carbon formation.

Thus the present invention is a combination of oxygenative and non-oxygenative synthesis gas generation processes integrated with a hydrocarbon synthesis process such as the Fischer-Tropsch process. In the present invention, the oxygenative process is carried out in a mixed conducting membrane reactor system and the non-oxygenative process is carried out preferably in a heat transfer reformer in which a portion of the required heat is provided by the hot synthesis gas product from the mixed conducting membrane reactor. The integration of these oxygenative and non-oxygenative synthesis gas generation processes with the Fischer-Tropsch process according to the present invention has advantages over conventional hydrocarbon synthesis technology. These advantages include: (1) the ability to recycle a large fraction of the F-T offgas to the synthesis gas generation system with minimum compression requirements; (2) the use of water from the F-T process to provide process steam to the synthesis gas generation system; (3) the ability to withdraw net water production from the integrated process as clean condensate from the raw synthesis gas stream or as vapor exhaust from expanded steam; and (4) the reduction of $CO_2$ emissions by more efficient overall carbon conversion achieved in part by higher F-T offgas recycle. The combination of a non-oxygenative synthesis gas generator with the mixed conducting membrane reactor provides a beneficial sink for the excess steam produced in the F-T process, which otherwise might not be as efficiently utilized.

The essential characteristics of the present invention are described completely in the foregoing disclosure. One skilled in the art can understand the invention and make various modifications without departing from the basic spirit of the invention, and without deviating from the scope and equivalents of the claims which follow.

What is claimed is:

1. A method for making a hydrocarbon product which comprises:
  (a) providing a mixed conducting membrane reaction zone having an oxidant side and a reactant side which are separated by a solid mixed conducting membrane;
  (b) introducing a feed gas comprising at least methane into the reactant side of the mixed conducting membrane reaction zone;
  (c) heating an oxygen-containing oxidant gas feed and introducing the resulting heated oxidant gas feed into the oxidant side of the mixed conducting membrane reaction zone;
  (d) permeating oxygen from the oxidant side of the mixed conducting membrane reaction zone through the mixed conducting membrane to the reactant side of the mixed conducting membrane reactor and reacting the oxygen with the feed gas to form at least hydrogen and carbon monoxide;
  (e) withdrawing a hot synthesis gas product comprising at least hydrogen and carbon monoxide from the reactant side of the mixed conducting membrane reaction zone;
  (f) withdrawing a hot oxygen-depleted nonpermeate gas from the oxidant side of the mixed conducting membrane reaction zone;
  (g) providing a hydrocarbon synthesis and processing zone and reacting at least a portion of the synthesis gas product therein;
  (h) withdrawing from the hydrocarbon synthesis and processing zone streams comprising (1) a hydrocarbon product comprising components having greater than four carbon atoms, (2) an offgas comprising one or more components selected from the group consisting of hydrogen, carbon monoxide, carbon dioxide, methane, and hydrocarbons containing two or more carbon atoms, and (3) water; and
  (i) converting at least a portion of the offgas into a recycle gas and utilizing at least a portion of this recycle gas to provide a portion of the feed gas to the mixed conducting membrane reaction zone.

2. The method of claim 1 wherein the offgas is withdrawn at an initial absolute pressure and is compressed to a final absolute pressure such that the ratio of the final absolute pressure to the initial absolute pressure is less than about 3.0.

3. The method of claim 1 wherein at least 70% of the offgas is converted into recycle gas.

4. The method of claim 1 wherein the hydrocarbon synthesis and processing zone comprises a Fischer-Tropsch reactor system utilizing catalyst which contains one or more metals selected from the group consisting of iron, cobalt, and ruthenium.

5. The method of claim 1 which further comprises combining the recycle gas with natural gas and water, heating the combined stream, introducing the resulting heated combined methane-containing gas into a catalytic reforming reaction zone, withdrawing from the catalytic reforming reaction zone a partially reformed gas comprising methane, hydrogen, and carbon oxides, and utilizing the partially reformed gas to provide feed gas to the reactant side of the mixed conducting membrane reaction zone.

6. The method of claim 5 wherein at least a portion of the water is provided by a portion of the water from the hydrocarbon synthesis and processing zone.

7. The method of claim 5 wherein the combined methane-containing gas is heated prior to the catalytic reforming reaction zone in an indirectly fired heater.

8. The method of claim 5 wherein the catalytic reforming reaction zone is a fixed-bed adiabatic reactor and the combined methane-containing gas is heated prior to the catalytic reforming reaction zone by indirect heat exchange with the hot synthesis gas product from the reactant side of the mixed conducting membrane reaction zone.

9. The method of claim 5 wherein the catalytic reforming reaction zone is a fixed-bed adiabatic reactor and the combined methane-containing gas is heated prior to the catalytic reforming reaction zone by indirect heat exchange with the hot oxygen-depleted nonpermeate gas from the oxidant side of the mixed conducting membrane reaction zone.

10. The method of claim 5 wherein the catalytic reforming reaction zone is a gas-heated reformer, wherein heat is provided within the reaction zone by indirect heat exchange with the hot synthesis gas product from the reactant side of the mixed conducting membrane reaction zone, and wherein an intermediate cooled synthesis gas product is withdrawn from the gas heated reformer.

11. The method of claim 5 wherein the offgas, prior to mixing with steam, is reacted with hydrogen in a catalytic hydrogenation reactor to convert unsaturated hydrocarbons in the offgas to saturated hydrocarbons.

12. The method of claim 11 wherein the catalytic hydrogenation reactor contains a catalyst which is selective only to the hydrogenation of olefins, and wherein a stream of sulfur-containing natural gas is combined with the offgas prior to the catalytic hydrogenation reactor.

13. The method of claim 10 wherein at least a portion of the intermediate cooled synthesis gas product is cooled to condense and remove water contained therein prior to the hydrocarbon synthesis and processing zone.

14. A method for making a hydrocarbon product which comprises:
  (a) providing a mixed conducting membrane reaction zone having an oxidant side and a reactant side which are separated by a solid mixed conducting membrane;

(b) introducing a feed gas comprising at least methane and water into the reactant side of the mixed conducting membrane reaction zone;

(c) heating an oxygen-containing oxidant gas feed and introducing the resulting heated oxidant gas feed into the oxidant side of the mixed conducting membrane reaction zone;

(d) permeating oxygen from the oxidant side of the mixed conducting membrane reaction zone through the mixed conducting membrane to the reactant side of the mixed conducting membrane reactor and reacting the oxygen with the feed gas to form at least hydrogen and carbon monoxide;

(e) withdrawing a hot synthesis gas product comprising at least hydrogen and carbon monoxide from the reactant side of the mixed conducting membrane reaction zone;

(f) providing a hydrocarbon synthesis and processing zone and reacting at least a portion of the synthesis gas product therein;

(g) withdrawing from the hydrocarbon synthesis and processing zone streams comprising (1) a hydrocarbon product comprising components having greater than four carbon atoms, (2) an offgas comprising one or more components selected from the group consisting of hydrogen, carbon monoxide, carbon dioxide, methane, and hydrocarbons containing two or more carbon atoms, and (3) water; and (i) providing at least a portion of the water in the feed gas of (b) by a portion of the water withdrawn from the hydrocarbon synthesis and processing zone of (g).

15. A method for making a hydrocarbon product which comprises:

(a) providing a first catalytic reforming reaction zone comprising at least one catalyst which promotes the steam reforming of hydrocarbons;

(b) heating a reactant gas feed comprising water and one or more hydrocarbons, introducing the resulting heated reactant gas feed into the first catalytic reforming reaction zone, and withdrawing therefrom a partially reformed intermediate gas comprising at least methane, hydrogen, and carbon oxides;

(c) providing a mixed conducting membrane reaction zone having an oxidant side and a reactant side which are separated by a solid mixed conducting membrane;

(d) heating an oxygen-containing oxidant gas feed and introducing the resulting heated oxidant gas feed into the oxidant side of the mixed conducting membrane reaction zone;

(e) introducing the partially reformed intermediate gas of (b) into the reactant side of the mixed conducting membrane reaction zone;

(f) permeating oxygen from the oxidant side of the mixed conducting membrane reactor through the mixed conducting membrane to the reactant side of the mixed conducting membrane reaction zone, and reacting the oxygen with the partially reformed intermediate gas to form additional hydrogen and carbon monoxide;

(g) withdrawing a hot synthesis gas product comprising at least hydrogen and carbon monoxide from the reactant side of the mixed conducting membrane reaction zone;

(h) withdrawing a hot oxygen-depleted nonpermeate gas from the oxidant side of the mixed conducting membrane reaction zone;

(i) reacting a hydrocarbon-containing recycle stream and water in a second catalytic reforming reaction zone to generate recycle gas comprising at least methane, hydrogen, and carbon oxides;

(j) providing a hydrocarbon synthesis and processing zone and reacting therein at least a portion of a combined stream comprising the synthesis gas product of (g) and the recycle gas of (i);

(k) withdrawing from the hydrocarbon synthesis reaction zone streams comprising (1) a hydrocarbon product comprising components having greater than four carbon atoms, (2) an offgas comprising components selected from the group consisting of hydrogen, carbon monoxide, carbon dioxide, methane, and hydrocarbons containing two or more carbon atoms, and (3) water; and (l) utilizing at least a portion of the offgas of (k) to provide the hydrocarbon-containing recycle stream of (i).

16. The method of claim 15 wherein the reactant gas feed of (b) is natural gas.

17. The method of claim 15 wherein at least 70% of the offgas of (k) is utilized to provide the hydrocarbon-containing recycle stream of (i).

18. The method of claim 15 wherein the hydrocarbon synthesis and processing zone comprises a Fischer-Tropsch reactor system utilizing catalyst which contains one or more metals selected from the group consisting of iron, cobalt, and ruthenium.

19. The method of claim 15 wherein the second catalytic reforming reaction zone is an enhanced heat transfer reformer, wherein heat is provided to the reaction zone by indirect heat exchange with the hot synthesis gas product from the reactant side of the mixed conducting membrane reaction zone, and wherein the effluent from the enhanced heat transfer reformer is a combination of the synthesis gas product of (g) after cooling and the recycle gas of (i).

20. The method of claim 15 wherein at least a portion of the water in the reactant gas feed to the first catalytic reforming reaction zone is provided by a portion of the water from the hydrocarbon synthesis and processing zone.

21. The method of claim 15 wherein at least a portion of the water to the second catalytic reforming reaction zone is provided by a portion of the water from the hydrocarbon synthesis and processing zone.

22. The method of claim 15 wherein the hydrocarbon-containing recycle stream, prior to mixing with water, is reacted with hydrogen in a catalytic hydrogenation reactor to convert unsaturated hydrocarbons in the offgas to saturated hydrocarbons.

23. The method of claim 22 wherein the catalytic hydrogenation reactor contains a catalyst which is selective only to the hydrogenation of olefins, and wherein a stream of sulfur-containing natural gas is combined with the offgas prior to the catalytic hydrogenation reactor.

24. The method of claim 19 wherein at least a portion of the effluent from the enhanced heat transfer reformer is cooled to condense and remove water contained therein prior to the hydrocarbon synthesis reaction zone.

25. A method for making a hydrocarbon product which comprises:

(a) providing a catalytic reforming reaction zone comprising at least one catalyst which promotes the steam reforming of hydrocarbons;

(b) heating a reactant gas feed comprising water and one or more hydrocarbons, introducing the resulting heated reactant gas feed into the catalytic reforming reaction zone, and withdrawing therefrom a hot partially reformed intermediate gas comprising at least methane, hydrogen, and carbon oxides;

(c) providing a mixed conducting membrane reaction zone having an oxidant side and a reactant side which are separated by a solid mixed conducting membrane;

(d) heating an oxygen-containing oxidant gas feed and introducing the resulting heated oxidant gas feed into the oxidant side of the mixed conducting membrane reaction zone;

(e) introducing the partially reformed intermediate gas of (b) into the reactant side of the mixed conducting membrane reaction zone;

(f) permeating oxygen from the oxidant side of the mixed conducting membrane reactor through the mixed conducting membrane to the reactant side of the mixed conducting membrane reaction zone, and reacting the oxygen with the partially reformed intermediate gas to form additional hydrogen and carbon monoxide;

(g) withdrawing a hot synthesis gas product comprising at least hydrogen and carbon monoxide from the reactant side of the mixed conducting membrane reaction zone;

(h) providing a hydrocarbon synthesis and processing zone and reacting therein at least a portion of the hot synthesis gas product of (g);

(i) withdrawing from the hydrocarbon synthesis and processing zone streams comprising (1) a hydrocarbon product comprising components having greater than four carbon atoms, (2) an offgas comprising components selected from the group consisting of hydrogen, carbon monoxide, carbon dioxide, methane, and hydrocarbons containing two or more carbon atoms, and (3) water; and (j) utilizing a portion of the water from the hydrocarbon synthesis and processing zone of (i) to provide at least a portion of the water in the reactant gas feed of (b).

* * * * *